US009062898B2

(12) United States Patent
Held et al.

(10) Patent No.: US 9,062,898 B2
(45) Date of Patent: Jun. 23, 2015

(54) CARBON DIOXIDE REFRIGERATION CYCLE

(71) Applicants: Timothy James Held, Akron, OH (US); Michael Louis Vermeersch, Hamilton, OH (US); Tao Xie, Copley, OH (US)

(72) Inventors: Timothy James Held, Akron, OH (US); Michael Louis Vermeersch, Hamilton, OH (US); Tao Xie, Copley, OH (US)

(73) Assignee: Echogen Power Systems, LLC, Akron, OH (US)

( * ) Notice: Subject to any disclaimer, the term of this patent is extended or adjusted under 35 U.S.C. 154(b) by 344 days.

(21) Appl. No.: 13/644,177

(22) Filed: Oct. 3, 2012

(65) Prior Publication Data

US 2014/0090405 A1    Apr. 3, 2014

Related U.S. Application Data

(60) Provisional application No. 61/542,478, filed on Oct. 3, 2011.

(51) Int. Cl.
  *F25B 1/06*    (2006.01)
(52) U.S. Cl.
  CPC ........................................ *F25B 1/06* (2013.01)
(58) Field of Classification Search
  CPC ............ F25B 9/08; F25B 1/06; F25B 1/2341; F25B 27/02; F25B 30/06; F25B 9/006; F25B 2309/06
  See application file for complete search history.

(56) References Cited

U.S. PATENT DOCUMENTS

| 2,575,478 A | 11/1951 | Wilson |
| 2,634,375 A | 4/1953 | Guimbal |
| 2,691,280 A | 10/1954 | Albert |
| 3,095,274 A | 6/1963 | Crawford |
| 3,105,748 A | 10/1963 | Stahl |

(Continued)

FOREIGN PATENT DOCUMENTS

| CA | 2794150 A1 | 11/2011 |
| CN | 1165238 A | 11/1997 |

(Continued)

OTHER PUBLICATIONS

Alpy, N., et al., "French Atomic Energy Commission views as regards SCO2 Cycle Development priorities and related R&D approach," Presentation, Symposium on SCO2 Power Cycles, Apr. 29-30, 2009, Troy, NY, 20 pages.

(Continued)

*Primary Examiner* — Cassey D Bauer
(74) *Attorney, Agent, or Firm* — Edmonds & Nolte, PC

(57) ABSTRACT

A refrigeration cycle is operated in conjunction with various thermodynamic cycle working fluid circuits to cool a target fluid that may be used in a separate system or duty. In one embodiment, the refrigeration cycle includes an ejector that extracts a motive fluid from the working fluid cycles in order to entrain a suction fluid that is also extracted from the working fluid circuits. Expanding the suction fluid reduces the pressure and temperature of the suction fluid for cooling the target fluid in an evaporator, which evaporates the suction fluid before being entrained into the ejector by the motive fluid. A mixed fluid is discharged from the ejector and injected into the working fluid circuits upstream from a condenser that cools the mixed fluid and the working fluid circulating throughout the working fluid circuits.

20 Claims, 9 Drawing Sheets

(56) References Cited

U.S. PATENT DOCUMENTS

| | | |
|---|---|---|
| 3,237,403 A | 3/1966 | Feher |
| 3,277,955 A | 10/1966 | Laszlo |
| 3,401,277 A | 9/1968 | Larson |
| 3,622,767 A | 11/1971 | Koepcke |
| 3,630,022 A | 12/1971 | Jubb |
| 3,736,745 A | 6/1973 | Karig |
| 3,772,879 A | 11/1973 | Engdahl |
| 3,791,137 A | 2/1974 | Jubb |
| 3,830,062 A | 8/1974 | Morgan et al. |
| 3,939,328 A | 2/1976 | Davis |
| 3,971,211 A | 7/1976 | Wethe |
| 3,982,379 A | 9/1976 | Gilli |
| 3,998,058 A | 12/1976 | Park |
| 4,009,575 A | 3/1977 | Hartman, Jr. |
| 4,029,255 A | 6/1977 | Heiser |
| 4,030,312 A | 6/1977 | Wallin |
| 4,049,407 A | 9/1977 | Bottum |
| 4,070,870 A | 1/1978 | Bahel |
| 4,099,381 A | 7/1978 | Rappoport |
| 4,119,140 A | 10/1978 | Cates |
| 4,150,547 A | 4/1979 | Hobson |
| 4,152,901 A | 5/1979 | Munters |
| 4,164,848 A | 8/1979 | Gilli |
| 4,164,849 A | 8/1979 | Mangus |
| 4,170,435 A | 10/1979 | Swearingen |
| 4,182,960 A | 1/1980 | Reuyl |
| 4,183,220 A | 1/1980 | Shaw |
| 4,198,827 A | 4/1980 | Terry et al. |
| 4,208,882 A | 6/1980 | Lopes |
| 4,221,185 A | 9/1980 | Scholes |
| 4,233,085 A | 11/1980 | Roderick |
| 4,236,869 A | 12/1980 | Laurello |
| 4,248,049 A | 2/1981 | Briley |
| 4,257,232 A | 3/1981 | Bell |
| 4,287,430 A | 9/1981 | Guido |
| 4,336,692 A | 6/1982 | Ecker |
| 4,347,711 A | 9/1982 | Noe |
| 4,347,714 A | 9/1982 | Kinsell |
| 4,372,125 A | 2/1983 | Dickenson |
| 4,384,568 A | 5/1983 | Palmatier |
| 4,391,101 A | 7/1983 | Labbe |
| 4,420,947 A | 12/1983 | Yoshino |
| 4,428,190 A | 1/1984 | Bronicki |
| 4,433,554 A | 2/1984 | Rojey |
| 4,439,687 A | 3/1984 | Wood |
| 4,439,994 A | 4/1984 | Briley |
| 4,448,033 A | 5/1984 | Briccetti |
| 4,450,363 A | 5/1984 | Russell |
| 4,455,836 A | 6/1984 | Binstock |
| 4,467,609 A | 8/1984 | Loomis |
| 4,467,621 A | 8/1984 | O'Brien |
| 4,475,353 A | 10/1984 | Lazare |
| 4,489,562 A | 12/1984 | Snyder |
| 4,489,563 A | 12/1984 | Kalina |
| 4,498,289 A | 2/1985 | Osgerby |
| 4,516,403 A | 5/1985 | Tanaka |
| 4,538,960 A | 9/1985 | Iino et al. |
| 4,549,401 A | 10/1985 | Spliethoff |
| 4,555,905 A | 12/1985 | Endou |
| 4,558,228 A | 12/1985 | Larjola |
| 4,573,321 A | 3/1986 | Knaebel |
| 4,578,953 A | 4/1986 | Krieger |
| 4,589,255 A | 5/1986 | Martens |
| 4,636,578 A | 1/1987 | Feinberg |
| 4,674,297 A | 6/1987 | Vobach |
| 4,694,189 A | 9/1987 | Haraguchi |
| 4,697,981 A | 10/1987 | Brown et al. |
| 4,700,543 A | 10/1987 | Krieger |
| 4,730,977 A | 3/1988 | Haaser |
| 4,756,162 A | 7/1988 | Dayan |
| 4,765,143 A | 8/1988 | Crawford |
| 4,773,212 A | 9/1988 | Griffin |
| 4,798,056 A | 1/1989 | Franklin |
| 4,813,242 A | 3/1989 | Wicks |
| 4,821,514 A | 4/1989 | Schmidt |
| 4,867,633 A | 9/1989 | Gravelle |
| 4,892,459 A | 1/1990 | Guelich |
| 4,986,071 A | 1/1991 | Voss |
| 4,993,483 A | 2/1991 | Harris |
| 5,000,003 A | 3/1991 | Wicks |
| 5,050,375 A | 9/1991 | Dickinson |
| 5,083,425 A | 1/1992 | Hendriks et al. |
| 5,098,194 A | 3/1992 | Kuo |
| 5,102,295 A | 4/1992 | Pope |
| 5,104,284 A | 4/1992 | Hustak, Jr. et al. |
| 5,164,020 A | 11/1992 | Wagner |
| 5,176,321 A | 1/1993 | Doherty |
| 5,203,159 A | 4/1993 | Koizumi et al. |
| 5,228,310 A | 7/1993 | Vandenberg |
| 5,291,960 A | 3/1994 | Brandenburg |
| 5,320,482 A | 6/1994 | Palmer et al. |
| 5,335,510 A | 8/1994 | Rockenfeller |
| 5,358,378 A | 10/1994 | Holscher |
| 5,360,057 A | 11/1994 | Rockenfeller |
| 5,392,606 A | 2/1995 | Labinov |
| 5,440,882 A | 8/1995 | Kalina |
| 5,444,972 A | 8/1995 | Moore |
| 5,488,828 A | 2/1996 | Brossard |
| 5,490,386 A | 2/1996 | Keller |
| 5,503,222 A | 4/1996 | Dunne |
| 5,531,073 A | 7/1996 | Bronicki |
| 5,538,564 A | 7/1996 | Kaschmitter |
| 5,542,203 A | 8/1996 | Luoma |
| 5,570,578 A | 11/1996 | Saujet |
| 5,588,298 A | 12/1996 | Kalina |
| 5,600,967 A | 2/1997 | Meckler |
| 5,634,340 A | 6/1997 | Grennan |
| 5,647,221 A | 7/1997 | Garris, Jr. |
| 5,649,426 A | 7/1997 | Kalina |
| 5,676,382 A | 10/1997 | Dahlheimer |
| 5,680,753 A | 10/1997 | Hollinger |
| 5,738,164 A | 4/1998 | Hildebrand |
| 5,754,613 A | 5/1998 | Hashiguchi |
| 5,771,700 A | 6/1998 | Cochran |
| 5,789,822 A | 8/1998 | Calistrat |
| 5,813,215 A | 9/1998 | Weisser |
| 5,833,876 A | 11/1998 | Schnur |
| 5,862,666 A | 1/1999 | Liu |
| 5,873,260 A | 2/1999 | Linhardt |
| 5,874,039 A | 2/1999 | Edelson |
| 5,894,836 A | 4/1999 | Wu |
| 5,899,067 A | 5/1999 | Hageman |
| 5,903,060 A | 5/1999 | Norton |
| 5,918,460 A | 7/1999 | Connell |
| 5,941,238 A | 8/1999 | Tracy |
| 5,943,869 A | 8/1999 | Cheng |
| 5,946,931 A | 9/1999 | Lomax |
| 5,973,050 A | 10/1999 | Johnson |
| 6,037,683 A | 3/2000 | Lulay |
| 6,041,604 A | 3/2000 | Nicodemus |
| 6,058,930 A | 5/2000 | Shingleton |
| 6,062,815 A | 5/2000 | Holt |
| 6,065,280 A | 5/2000 | Ranasinghe |
| 6,066,797 A | 5/2000 | Toyomura |
| 6,070,405 A | 6/2000 | Jerye |
| 6,082,110 A | 7/2000 | Rosenblatt |
| 6,105,368 A | 8/2000 | Hansen |
| 6,112,547 A | 9/2000 | Spauschus |
| 6,129,507 A | 10/2000 | Ganelin |
| 6,158,237 A | 12/2000 | Riffat |
| 6,164,655 A | 12/2000 | Bothien |
| 6,202,782 B1 | 3/2001 | Hatanaka |
| 6,223,846 B1 | 5/2001 | Schechter |
| 6,233,938 B1 | 5/2001 | Nicodemus |
| 6,282,900 B1 | 9/2001 | Bell |
| 6,282,917 B1 | 9/2001 | Mongan |
| 6,295,818 B1 | 10/2001 | Ansley |
| 6,299,690 B1 | 10/2001 | Mongeon |
| 6,341,781 B1 | 1/2002 | Matz |
| 6,374,630 B1 | 4/2002 | Jones |
| 6,393,851 B1 | 5/2002 | Wightman |
| 6,432,320 B1 | 8/2002 | Bonsignore |
| 6,434,955 B1 | 8/2002 | Ng |
| 6,442,951 B1 | 9/2002 | Maeda |

(56) References Cited

U.S. PATENT DOCUMENTS

| | | |
|---|---|---|
| 6,446,425 B1 | 9/2002 | Lawlor |
| 6,446,465 B1 | 9/2002 | Dubar |
| 6,463,730 B1 | 10/2002 | Keller |
| 6,484,490 B1 | 11/2002 | Olsen |
| 6,539,720 B2 | 4/2003 | Rouse et al. |
| 6,539,728 B2 | 4/2003 | Korin |
| 6,571,548 B1 | 6/2003 | Bronicki |
| 6,581,384 B1 | 6/2003 | Benson |
| 6,598,397 B2 | 7/2003 | Hanna |
| 6,644,062 B1 | 11/2003 | Hays |
| 6,657,849 B1 | 12/2003 | Andresakis |
| 6,668,554 B1 | 12/2003 | Brown |
| 6,684,625 B2 | 2/2004 | Kline |
| 6,695,974 B2 | 2/2004 | Withers |
| 6,715,294 B2 | 4/2004 | Anderson |
| 6,734,585 B2 | 5/2004 | Tornquist |
| 6,735,948 B1 | 5/2004 | Kalina |
| 6,739,142 B2 | 5/2004 | Korin |
| 6,751,959 B1 | 6/2004 | McClanahan |
| 6,769,256 B1 | 8/2004 | Kalina |
| 6,799,892 B2 | 10/2004 | Leuthold |
| 6,808,179 B1 | 10/2004 | Bhattacharyya |
| 6,810,335 B2 | 10/2004 | Lysaght |
| 6,817,185 B2 | 11/2004 | Coney |
| 6,857,268 B2 | 2/2005 | Stinger |
| 6,910,334 B2 | 6/2005 | Kalina |
| 6,918,254 B2 | 7/2005 | Baker |
| 6,921,518 B2 | 7/2005 | Johnston |
| 6,941,757 B2 | 9/2005 | Kalina |
| 6,960,839 B2 | 11/2005 | Zimron |
| 6,960,840 B2 | 11/2005 | Willis |
| 6,962,054 B1 | 11/2005 | Linney |
| 6,964,168 B1 | 11/2005 | Pierson |
| 6,968,690 B2 | 11/2005 | Kalina |
| 6,986,251 B2 | 1/2006 | Radcliff |
| 7,013,205 B1 | 3/2006 | Hafner et al. |
| 7,021,060 B1 | 4/2006 | Kalina |
| 7,022,294 B2 | 4/2006 | Johnston |
| 7,033,533 B2 | 4/2006 | Lewis-Aburn et al. |
| 7,033,553 B2 | 4/2006 | Johnston et al. |
| 7,036,315 B2 | 5/2006 | Kang |
| 7,041,272 B2 | 5/2006 | Keefer |
| 7,047,744 B1 | 5/2006 | Robertson |
| 7,048,782 B1 | 5/2006 | Couch |
| 7,062,913 B2 | 6/2006 | Christensen |
| 7,096,665 B2 | 8/2006 | Stinger |
| 7,096,679 B2 | 8/2006 | Manole |
| 7,124,587 B1 | 10/2006 | Linney |
| 7,174,715 B2 | 2/2007 | Armitage |
| 7,194,863 B2 | 3/2007 | Ganev |
| 7,197,876 B1 | 4/2007 | Kalina |
| 7,200,996 B2 | 4/2007 | Cogswell |
| 7,234,314 B1 | 6/2007 | Wiggs |
| 7,249,588 B2 | 7/2007 | Russell |
| 7,278,267 B2 | 10/2007 | Yamada |
| 7,279,800 B2 | 10/2007 | Bassett |
| 7,287,381 B1 | 10/2007 | Pierson |
| 7,305,829 B2 | 12/2007 | Mirolli |
| 7,313,926 B2 | 1/2008 | Gurin |
| 7,340,894 B2 | 3/2008 | Miyahara et al. |
| 7,340,897 B2 | 3/2008 | Zimron |
| 7,406,830 B2 | 8/2008 | Valentian |
| 7,416,137 B2 | 8/2008 | Hagen et al. |
| 7,453,242 B2 | 11/2008 | Ichinose |
| 7,458,217 B2 | 12/2008 | Kalina |
| 7,458,218 B2 | 12/2008 | Kalina |
| 7,464,551 B2 | 12/2008 | Althaus et al. |
| 7,469,542 B2 | 12/2008 | Kalina |
| 7,516,619 B2 | 4/2009 | Pelletier |
| 7,600,394 B2 | 10/2009 | Kalina |
| 7,621,133 B2 | 11/2009 | Tomlinson |
| 7,654,354 B1 | 2/2010 | Otterstrom |
| 7,665,291 B2 | 2/2010 | Anand |
| 7,665,304 B2 | 2/2010 | Sundel |
| 7,685,821 B2 | 3/2010 | Kalina |
| 7,730,713 B2 | 6/2010 | Nakano |
| 7,735,335 B2 | 6/2010 | Uno |
| 7,770,376 B1 | 8/2010 | Brostmeyer |
| 7,775,758 B2 | 8/2010 | Legare |
| 7,827,791 B2 | 11/2010 | Pierson |
| 7,838,470 B2 | 11/2010 | Shaw |
| 7,841,179 B2 | 11/2010 | Kalina |
| 7,841,306 B2 | 11/2010 | Myers |
| 7,854,587 B2 | 12/2010 | Ito |
| 7,866,157 B2 | 1/2011 | Ernst |
| 7,900,450 B2 | 3/2011 | Gurin |
| 7,950,230 B2 | 5/2011 | Nishikawa |
| 7,950,243 B2 | 5/2011 | Gurin |
| 7,972,529 B2 | 7/2011 | Machado |
| 7,997,076 B2 | 8/2011 | Ernst |
| 8,096,128 B2 | 1/2012 | Held et al. |
| 8,099,198 B2 | 1/2012 | Gurin |
| 8,146,360 B2 | 4/2012 | Myers |
| 8,281,593 B2 | 10/2012 | Held |
| 8,419,936 B2 | 4/2013 | Berger et al. |
| 2001/0015061 A1 | 8/2001 | Viteri et al. |
| 2001/0020444 A1 | 9/2001 | Johnston |
| 2001/0030952 A1 | 10/2001 | Roy |
| 2002/0029558 A1 | 3/2002 | Tamaro |
| 2002/0066270 A1 | 6/2002 | Rouse et al. |
| 2002/0078696 A1 | 6/2002 | Korin |
| 2002/0078697 A1 | 6/2002 | Lifson |
| 2002/0082747 A1 | 6/2002 | Kramer |
| 2003/0000213 A1 | 1/2003 | Christensen |
| 2003/0061823 A1 | 4/2003 | Alden |
| 2003/0154718 A1 | 8/2003 | Nayar |
| 2003/0182946 A1 | 10/2003 | Sami |
| 2003/0213246 A1 | 11/2003 | Coll et al. |
| 2003/0221438 A1 | 12/2003 | Rane et al. |
| 2004/0011038 A1 | 1/2004 | Stinger |
| 2004/0011039 A1 | 1/2004 | Stinger et al. |
| 2004/0020185 A1 | 2/2004 | Brouillette et al. |
| 2004/0020206 A1 | 2/2004 | Sullivan et al. |
| 2004/0021182 A1 | 2/2004 | Green et al. |
| 2004/0035117 A1 | 2/2004 | Rosen |
| 2004/0083731 A1 | 5/2004 | Lasker |
| 2004/0083732 A1 | 5/2004 | Hanna et al. |
| 2004/0088992 A1 | 5/2004 | Brasz et al. |
| 2004/0097388 A1 | 5/2004 | Brask et al. |
| 2004/0105980 A1 | 6/2004 | Sudarshan et al. |
| 2004/0107700 A1 | 6/2004 | McClanahan et al. |
| 2004/0159110 A1 | 8/2004 | Janssen |
| 2004/0211182 A1 | 10/2004 | Gould |
| 2005/0022963 A1 | 2/2005 | Garrabrant et al. |
| 2005/0056001 A1 | 3/2005 | Frutschi |
| 2005/0096676 A1 | 5/2005 | Gifford, III et al. |
| 2005/0109387 A1 | 5/2005 | Marshall |
| 2005/0137777 A1 | 6/2005 | Kolavennu et al. |
| 2005/0162018 A1 | 7/2005 | Realmuto et al. |
| 2005/0167169 A1 | 8/2005 | Gering et al. |
| 2005/0183421 A1 | 8/2005 | Vaynberg et al. |
| 2005/0196676 A1 | 9/2005 | Singh et al. |
| 2005/0198959 A1 | 9/2005 | Schubert |
| 2005/0227187 A1 | 10/2005 | Schilling |
| 2005/0252235 A1 | 11/2005 | Critoph et al. |
| 2005/0257812 A1 | 11/2005 | Wright et al. |
| 2006/0010868 A1 | 1/2006 | Smith |
| 2006/0060333 A1 | 3/2006 | Chordia et al. |
| 2006/0066113 A1 | 3/2006 | Ebrahim et al. |
| 2006/0080960 A1 | 4/2006 | Rajendran et al. |
| 2006/0112693 A1 | 6/2006 | Sundel |
| 2006/0182680 A1 | 8/2006 | Keefer et al. |
| 2006/0211871 A1 | 9/2006 | Dai et al. |
| 2006/0213218 A1 | 9/2006 | Uno et al. |
| 2006/0225421 A1 | 10/2006 | Yamanaka et al. |
| 2006/0225459 A1 | 10/2006 | Meyer |
| 2006/0249020 A1 | 11/2006 | Tonkovich et al. |
| 2006/0254281 A1 | 11/2006 | Badeer et al. |
| 2007/0001766 A1 | 1/2007 | Ripley et al. |
| 2007/0017192 A1 | 1/2007 | Bednarek et al. |
| 2007/0019708 A1 | 1/2007 | Shiflett et al. |
| 2007/0027038 A1 | 2/2007 | Kamimura et al. |
| 2007/0056290 A1 | 3/2007 | Dahm |
| 2007/0089449 A1 | 4/2007 | Gurin |

(56) References Cited

U.S. PATENT DOCUMENTS

| | | |
|---|---|---|
| 2007/0108200 A1 | 5/2007 | McKinzie, II |
| 2007/0119175 A1 | 5/2007 | Ruggieri et al. |
| 2007/0130952 A1 | 6/2007 | Copen |
| 2007/0151244 A1 | 7/2007 | Gurin |
| 2007/0161095 A1 | 7/2007 | Gurin |
| 2007/0163261 A1 | 7/2007 | Strathman |
| 2007/0195152 A1 | 8/2007 | Kawai et al. |
| 2007/0204620 A1 | 9/2007 | Pronske et al. |
| 2007/0227472 A1 | 10/2007 | Takeuchi et al. |
| 2007/0234722 A1 | 10/2007 | Kalina |
| 2007/0245733 A1 | 10/2007 | Pierson et al. |
| 2007/0246206 A1 | 10/2007 | Gong et al. |
| 2008/0000225 A1 | 1/2008 | Kalina |
| 2008/0006040 A1 | 1/2008 | Peterson et al. |
| 2008/0010967 A1 | 1/2008 | Griffin |
| 2008/0023666 A1 | 1/2008 | Gurin |
| 2008/0053095 A1 | 3/2008 | Kalina |
| 2008/0066470 A1 | 3/2008 | MacKnight |
| 2008/0135253 A1 | 6/2008 | Vinegar et al. |
| 2008/0163625 A1 | 7/2008 | O'Brien |
| 2008/0173450 A1 | 7/2008 | Goldberg et al. |
| 2008/0211230 A1 | 9/2008 | Gurin |
| 2008/0250789 A1 | 10/2008 | Myers et al. |
| 2008/0252078 A1 | 10/2008 | Myers |
| 2009/0021251 A1 | 1/2009 | Simon |
| 2009/0085709 A1 | 4/2009 | Meinke |
| 2009/0107144 A1 | 4/2009 | Moghtaderi et al. |
| 2009/0139234 A1 | 6/2009 | Gurin |
| 2009/0139781 A1 | 6/2009 | Straubel |
| 2009/0173337 A1 | 7/2009 | Tamaura et al. |
| 2009/0173486 A1 | 7/2009 | Copeland |
| 2009/0180903 A1 | 7/2009 | Martin et al. |
| 2009/0205892 A1 | 8/2009 | Jensen et al. |
| 2009/0211251 A1 | 8/2009 | Petersen et al. |
| 2009/0211253 A1 | 8/2009 | Radcliff et al. |
| 2009/0266075 A1 | 10/2009 | Westmeier et al. |
| 2009/0293503 A1 | 12/2009 | Vandor |
| 2010/0024421 A1 | 2/2010 | Litwin |
| 2010/0077792 A1 | 4/2010 | Gurin |
| 2010/0083662 A1 | 4/2010 | Kalina |
| 2010/0102008 A1 | 4/2010 | Hedberg |
| 2010/0122533 A1 | 5/2010 | Kalina |
| 2010/0146949 A1 | 6/2010 | Stobart et al. |
| 2010/0146973 A1 | 6/2010 | Kalina |
| 2010/0156112 A1 | 6/2010 | Held et al. |
| 2010/0162721 A1 | 7/2010 | Welch et al. |
| 2010/0205962 A1 | 8/2010 | Kalina |
| 2010/0218513 A1 | 9/2010 | Vaisman et al. |
| 2010/0218930 A1 | 9/2010 | Proeschel |
| 2010/0263380 A1 | 10/2010 | Biederman et al. |
| 2010/0287934 A1 | 11/2010 | Glynn et al. |
| 2010/0300093 A1 | 12/2010 | Doty |
| 2010/0326076 A1 | 12/2010 | Ast et al. |
| 2011/0027064 A1 | 2/2011 | Pal et al. |
| 2011/0030404 A1 | 2/2011 | Gurin |
| 2011/0048012 A1 | 3/2011 | Ernst et al. |
| 2011/0061384 A1 | 3/2011 | Held et al. |
| 2011/0061387 A1 | 3/2011 | Held et al. |
| 2011/0088399 A1 | 4/2011 | Briesch et al. |
| 2011/0179799 A1 | 7/2011 | Allam |
| 2011/0185729 A1 | 8/2011 | Held |
| 2011/0192163 A1 | 8/2011 | Kasuya |
| 2011/0203278 A1 | 8/2011 | Kopecek et al. |
| 2011/0259010 A1 | 10/2011 | Bronicki et al. |
| 2011/0299972 A1 | 12/2011 | Morris et al. |
| 2011/0308253 A1 | 12/2011 | Ritter |
| 2012/0047892 A1 | 3/2012 | Held et al. |
| 2012/0067055 A1 | 3/2012 | Held |
| 2012/0128463 A1 | 5/2012 | Held |
| 2012/0131918 A1 | 5/2012 | Held |
| 2012/0131919 A1 | 5/2012 | Held |
| 2012/0131920 A1 | 5/2012 | Held |
| 2012/0131921 A1 | 5/2012 | Held |
| 2012/0159922 A1 | 6/2012 | Gurin |
| 2012/0159956 A1 | 6/2012 | Gurin |
| 2012/0174558 A1 | 7/2012 | Gurin |
| 2012/0186219 A1 | 7/2012 | Gurin |
| 2012/0247134 A1 | 10/2012 | Gurin |
| 2012/0247455 A1 | 10/2012 | Gurin et al. |
| 2012/0261090 A1 | 10/2012 | Durmaz et al. |
| 2013/0019597 A1 | 1/2013 | Kalina |
| 2013/0033037 A1 | 2/2013 | Held et al. |
| 2013/0036736 A1 | 2/2013 | Hart et al. |
| 2013/0113221 A1 | 5/2013 | Held |

FOREIGN PATENT DOCUMENTS

| | | |
|---|---|---|
| CN | 1432102 | 7/2003 |
| CN | 101614139 A | 12/2009 |
| CN | 202055876 U | 11/2011 |
| CN | 202544943 U | 11/2012 |
| CN | 202718721 U | 2/2013 |
| DE | 2632777 A1 | 2/1977 |
| DE | 19906087 A1 | 8/2000 |
| DE | 10052993 A1 | 5/2002 |
| EP | 1977174 A2 | 10/2008 |
| EP | 1998013 A2 | 12/2008 |
| EP | 2419621 A1 | 2/2012 |
| EP | 2446122 A1 | 5/2012 |
| EP | 2478201 A1 | 7/2012 |
| EP | 2500530 A1 | 9/2012 |
| EP | 2550436 | 1/2013 |
| GB | 856985 A | 12/1960 |
| GB | 2010974 A | 7/1979 |
| GB | 2075608 A | 11/1981 |
| JP | 58-193051 A | 11/1983 |
| JP | 60040707 A | 3/1985 |
| JP | 61-152914 A | 7/1986 |
| JP | 01-240705 A | 9/1989 |
| JP | 05-321612 A | 12/1993 |
| JP | 06-331225 A | 11/1994 |
| JP | 08028805 A | 2/1996 |
| JP | 09-100702 A | 4/1997 |
| JP | 2641581 B2 | 5/1997 |
| JP | 09-209716 A | 8/1997 |
| JP | 2858750 B2 | 12/1998 |
| JP | H11270352 | 5/1999 |
| JP | 2000257407 A | 9/2000 |
| JP | 2001-193419 A | 7/2001 |
| JP | 2002-097965 A | 4/2002 |
| JP | 2003529715 A | 10/2003 |
| JP | 2004-239250 A | 8/2004 |
| JP | 2004-332626 A | 11/2004 |
| JP | 2005030727 A | 2/2005 |
| JP | 2005-533972 | 11/2005 |
| JP | 2005-533972 A1 | 11/2005 |
| JP | 2006037760 A | 2/2006 |
| JP | 2006177266 A | 7/2006 |
| JP | 2007-198200 | 8/2007 |
| JP | 2007-198200 A | 9/2007 |
| JP | 4343738 B2 | 10/2009 |
| JP | 2011-017268 A | 1/2011 |
| KR | 10-0191080 B1 | 6/1999 |
| KR | 100191080 | 6/1999 |
| KR | 10 2007 0086244 A | 8/2007 |
| KR | 10-0766101 B1 | 10/2007 |
| KR | 10-0844634 A | 7/2008 |
| KR | 10-0844634 B1 | 7/2008 |
| KR | 10-20100067927 A | 6/2010 |
| KR | 1020110018769 A | 2/2011 |
| KR | 1069914 B1 | 9/2011 |
| KR | 1103549 B1 | 1/2012 |
| KR | 10-2012-0058582 A | 6/2012 |
| KR | 2012-0068670 A | 6/2012 |
| KR | 2012-0128753 A | 11/2012 |
| KR | 2012-0128755 A | 11/2012 |
| WO | WO 91/05145 A1 | 4/1991 |
| WO | WO 96/09500 A1 | 3/1996 |
| WO | 0071944 A1 | 11/2000 |
| WO | WO 01/44658 A1 | 6/2001 |
| WO | WO 2006/060253 | 6/2006 |
| WO | WO 2006/137957 A1 | 12/2006 |
| WO | WO 2007/056241 A2 | 5/2007 |
| WO | WO 2007/079245 A2 | 7/2007 |

(56) References Cited

FOREIGN PATENT DOCUMENTS

| | | |
|---|---|---|
| WO | WO 2007/082103 A2 | 7/2007 |
| WO | WO 2007/112090 A2 | 10/2007 |
| WO | WO 2008/039725 A2 | 4/2008 |
| WO | 2008101711 A2 | 8/2008 |
| WO | 2009-045196 A1 | 4/2009 |
| WO | WO 2009/058992 A2 | 5/2009 |
| WO | 2010-074173 A1 | 7/2010 |
| WO | 2010083198 A1 | 7/2010 |
| WO | WO 2010/121255 A1 | 10/2010 |
| WO | WO 2010/126980 A2 | 11/2010 |
| WO | WO 2010/151560 A1 | 12/2010 |
| WO | WO 2011/017450 A2 | 2/2011 |
| WO | WO 2011/017476 A2 | 2/2011 |
| WO | WO 2011/017599 A1 | 2/2011 |
| WO | WO 2011/034984 A1 | 3/2011 |
| WO | WO 2011/094294 A2 | 8/2011 |
| WO | WO 2011/119650 A2 | 9/2011 |
| WO | 2012-074907 A2 | 6/2012 |
| WO | 2012-074911 A2 | 6/2012 |
| WO | 20124074905 A2 | 6/2012 |
| WO | WO 2012/074940 A2 | 6/2012 |
| WO | WO 2013/055391 A1 | 4/2013 |
| WO | WO 2013/059687 A1 | 4/2013 |
| WO | WO 2013/059695 A1 | 4/2013 |
| WO | WO 2013/070249 A1 | 5/2013 |
| WO | WO 2013/074907 A1 | 5/2013 |

OTHER PUBLICATIONS

Angelino, G., and Invernizzi, C.M., "Carbon Dioxide Power Cycles using Liquid Natural Gas as Heat Sink", Applied Thermal Engineering Mar. 3, 2009, 43 pages.

Bryant, John C., Saari, Henry, and Zanganeh, Kourosh, "An Analysis and Comparison of the Simple and Recompression Supercritical CO2 Cycles" Supercritical CO2 Power Cycle Symposium, May 24-25, 2011, Boulder, CO, 8 pages.

Chapman, Daniel J., Arias, Diego A., "An Assessment of the Supercritical Carbon Dioxide Cycle for Use in a Solar Parabolic Trough Power Plant", Presentation, Abengoa Solar, Apr. 29-30, 2009, Troy, NY, 20 pages.

Chapman, Daniel J., Arias, Diego A., "An Assessment of the Supercritical Carbon Dioxide Cycle for Use in a Solar Parabolic Trough Power Plant", Paper, Abengoa Solar, Apr. 29-30, 2009, Troy, NY, 5 pages.

Chen, Yang, Lundqvist, P., Johansson, A., Platell, P., "A Comparative Study of the Carbon Dioxide Transcritical Power Cycle Compared with an Organic Rankine Cycle with R123 as Working Fluid in Waste Heat Recovery", Science Direct, Applied Thermal Engineering, Jun. 12, 2006, 6 pages.

Chen, Yang, "Thermodynamic Cycles Using Carbon Dioxide as Working Fluid", Doctoral Thesis, School of Industrial Engineering and Management, Stockholm, Oct. 2011, 150 pages., (3 parts).

Chordia, Lalit, "Optimizing Equipment for Supercritical Applications", Thar Energy LLC, Supercritical CO2 Power Cycle Symposium, May 24-25, 2011, Boulder, CO, 7 pages.

Combs, Osie V., "An Investigation of the Supercritical CO2 Cycle (Feher cycle) for Shipboard Application", Massachusetts Institute of Technology, May 1977, 290 pages.

Di Bella, Francis A., "Gas Turbine Engine Exhaust Waste Heat Recovery Navy Shipboard Module Development", Supercritical CO2 Power Cycle Symposium, May 24-25, 2011, Boulder, CO, 8 pages.

Dostal, V., et al., A Supercritical Carbon Dioxide Cycle for Next Generation Nuclear Reactors, Mar. 10, 2004, 326 pages., (7 parts).

Dostal, Vaclav, and Dostal, Jan, "Supercritical CO2 Regeneration Bypass Cycle—Comparison to Traditional Layouts", Supercritical CO2 Power Cycle Symposium, May 24-25, 2011, Boulder, CO, 5 pages.

Eisemann, Kevin, and Fuller, Robert L., "Supercritical CO2 Brayton Cycle Design and System Start-up Options", Barber Nichols, Inc., Paper, Supercritical CO2 Power Cycle Symposium, May 24-25, 2011, Boulder, CO, 7 pages.

Eisemann, Kevin, and Fuller, Robert L., "Supercritical CO2 Brayton Cycle Design and System Start-up Options", Presentation, Supercritical CO2 Power Cycle Symposium, May 24-25, 2011, Boulder, CO, 11 pages.

Feher, E.G., et al.., "Investigation of Supercritical (Feher) Cycle", Astropower Laboratory, Missile & Space Systems Division, Oct. 1968, 152 pages.

Fuller, Robert L., and Eisemann, Kevin, "Centrifugal Compressor Off-Design Performance for Super-Critical CO2" , Barber Nichols, Inc. Presentation, Supercritical CO2 Power Cycle Symposium, May 24-25, 2011, Boulder, CO, 20 pages.

Fuller, Robert L., and Eisemann, Kevin, "Centrifugal Compressor Off-Design Performance for Super-Critical CO2", Paper, Supercritical CO2 Power Cycle Symposium, May 24-25, 2011, Boulder, CO, 12 pages.

Gokhstein, D.P. and Verkhivker, G.P. "Use of Carbon Dioxide as a Heat Carrier and Working Substance in Atomic Power Stations", Soviet Atomic Energy, Apr. 1969, vol. 26, Issue 4, pp. 430-432.

Gokhstein, D.P.; Taubman, El.; Konyaeva, G.P., "Thermodynamic Cycles of Carbon Dioxide Plant with an Additional Turbine After the Regenerator", Energy Citations Database, Mar. 1973, 1 Page, Abstract only.

Hejzlar, P. et al., "Assessment of Gas Cooled Gas Reactor with Indirect Supercritical CO2 Cycle" Massachusetts Institute of Technology, Jan. 2006, 10 pages.

Hoffman, John R., and Feher, E.G "150 kwe Supercritical Closed Cycle System", Transactions of the ASME, Jan. 1971, pp. 70-80.

Jeong, Woo Seok, et al., "Performance of S-CO2 Brayton Cycle with Additive Gases for SFR Application", Korea Advanced Institute of Science and Technology, Supercritical CO2 Power Cycle Symposium, May 24-25, 2011, Boulder, CO, 5 pages.

Johnson, Gregory A., & McDowell, Michael, "Issues Associated with Coupling Supercritical CO2 Power Cycles to Nuclear, Solar and Fossil Fuel Heat Sources", Hamilton Sundstrand, Energy Space & Defense-Rocketdyne, Apr. 29-30, 2009, Troy, NY, Presentation, 18 pages.

Kawakubo, Tomoki, "Unsteady Roto-Stator Interaction of a Radial-Inflow Turbine with Variable Nozzle Vanes", ASME Turbo Expo 2010: Power for Land, Sea, and Air; vol. 7: Turbomachinery, Parts A, B, and C; Glasgow, UK, Jun. 14-18, 2010, Paper No. GT2010-23677, pp. 2075-2084, (1 page, Abstract only).

Kulhanek, Martin, "Thermodynamic Analysis and Comparison of S-CO2 Cycles", Presentation, Czech Technical University in Prague, Supercritical CO2 Power Cycle Symposium, May 24-25, 2011, Boulder, CO, 14 pages.

Kulhanek, Martin, "Thermodynamic Analysis and Comparison of S-CO2 Cycles", Paper, Czech Technical University in Prague, Supercritical CO2 Power Cycle Symposium, May 24-25, 2011, Boulder, CO, 7 pages.

Kulhanek, Martin., and Dostal, Vaclav, "Supercritical Carbon Dioxide Cycles Thermodynamic Analysis and Comparison", Abstract, Faculty Conference held in Prague, Mar. 24, 2009, 13 pages.

Ma, Zhiwen and Turchi, Craig S., "Advanced Supercritical Carbon Dioxide Power Cycle Configurations for Use in Concentrating Solar Power Systems", National Renewable Energy Laboratory, Supercritical CO2 Power Cycle Symposium, May 24-25, 2011, Boulder, CO, 4 pages.

Moisseytsev, Anton, and Sienicki, Jim, "Investigation of Alternative Layouts for the Supercritical Carbon Dioxide Brayton Cycle for a Sodium-Cooled Fast Reactor", Supercritical CO2 Power Cycle Symposium, Troy, NY, Apr. 29, 2009, 26 pages.

Munoz De Escalona, Jose M., "The Potential of the Supercritical Carbon Dioxide Cycle in High Temperature Fuel Cell Hybrid Systems", Paper, Thermal Power Group, University of Seville, Supercritical CO2 Power Cycle Symposium, May 24-25, 2011, Boulder, CO, 6 pages.

Munoz De Escalona, Jose M., et al., "The Potential of the Supercritical Carbon Dioxide Cycle in High Temperature Fuel Cell Hybrid Systems", Presentation, Thermal Power Group, University of Seville, Supercritical CO2 Power Cycle Symposium, May 24-25, 2011, Boulder, CO, 19 pages.

(56) References Cited

OTHER PUBLICATIONS

Muto, Y., et al., "Application of Supercritical CO2 Gas Turbine for the Fossil Fired Thermal Plant", Journal of Energy and Power Engineering, Sep. 30, 2010, vol. 4, No. 9, 9 pages.
Noriega, Bahamonde J.S., "Design Method for s-CO2 Gas Turbine Power Plants", Master of Science Thesis, Delft University of Technology, Oct. 2012, 122 pages., (3 parts).
Oh, Chang, et al., "Development of a Supercritical Carbon Dioxide Brayton Cycle: Improving PBR Efficiency and Testing Material Compatibility", Presentation, Nuclear Energy Research Initiative Report, Oct. 2004, 38 pages.
Oh, Chang; et al., "Development of a Supercritical Carbon Dioxide Brayton Cycle: Improving VHTR Efficiency and Testing Material Compatibility", Presentation, Nuclear Energy Research Initiative Report, Final Report, Mar. 2006, 97 pages.
Parma, Ed, et at, "Supercritical CO2 Direct Cycle Gas Fast Reactor (SC-GFR) Concept" Presentation for Supercritical CO2 Power Cycle Symposium, May 24-25, 2011, Boulder, CO, 40 pages.
Parma, Ed, et al., "Supercritical CO2 Direct Cycle Gas Fast Reactor (SC-GFR) Concept", Supercritical CO2 Power Cycle Symposium, May 24-25, 2011, Boulder, CO, 9 pages.
Parma, Edward J., et al., "Supercritical CO2 Direct Cycle Gas Fast Reactor (SC-GFR) Concept", Presentation, Sandia National Laboratories, May 2011, 55 pages.
PCT/US2006/049623—Written Opinion of ISA dated Jan. 4, 2008, 4 pages.
PCT/US2007/001120—International Search Report dated Apr. 25, 2008, 7 pages.
PCT/US2007/079318—International Preliminary Report on Patentability dated Jul. 7, 2008, 5 pages.
PCT/US2010/031614—International Search Report dated Jul. 12, 2010, 3 pages.
PCT/US2010/031614—International Preliminary Report on Patentability dated Oct. 27, 2011, 9 pages.
PCT/US2010/039559—International Preliminary Report on Patentability dated Jan. 12, 2012, 7 pages.
PCT/US2010/039559—Notification of Transmittal of the International Search Report and Written Opinion of the International Searching Authority, or the Declaration dated Sep. 1, 2010, 6 pages.
PCT/US2010/044476—International Search Report dated Sep. 29, 2010, 23 pages.
PCT/US2010/044681—International Search Report and Written Opinion mailed Oct. 7, 2010, 10 pages.
PCT/US2010/044681—International Preliminary Report on Patentability dated Feb. 16, 2012, 9 pages.
PCT/US2010/049042—International Search Report and Written Opinion dated Nov. 17, 2010, 11 pages.
PCT/US2010/049042—International Preliminary Report on Patentability dated Mar. 29, 2012, 18 pages.
PCT/US2011/029486—International Preliminary Report on Patentability dated Sep. 25, 2012, 6 pages.
PCT/US2011/029486—International Search Report and Written Opinion dated Nov. 16, 2011, 9 pages.
PCT/US2011/062266—International Search Report and Written Opinion dated Jul. 9, 2012, 12 pages.
PCT/US2011/062198—International Search Report and Written Opinion dated Jul. 2, 2012, 9 pages.
PCT/US2011/062201—International Search Report and Written Opinion dated Jun. 26, 2012, 9 pages.
PCT/US2011/062204—International Search Report dated Nov. 1, 2012, 10 pages.
PCT/US2011/62207—International Search Report and Written Opinion dated Jun. 28, 2012, 7 pages.
PCT/US2012/000470—International Search Report dated Mar. 8, 2013, 10 pages.
PCT/US2012/061151—International Search Report and Written Opinion dated Feb. 25, 2013, 9 pages.
PCT/US2012/061159—International Search Report dated Mar. 2, 2013, 10 pages.
Persichilli, Michael, et al., "Supercritical CO2 Power Cycle Developments and Commercialization: Why sCO2 can Displace Steam" Echogen Power Systems LLC, Power-Gen India & Central Asia 2012, Apr. 19-21, 2012, New Delhi, India, 15 pages.
Saari, Henry, et al., "Supercritical CO2 Advanced Brayton Cycle Design", Presentation, Carleton University, Supercritical CO2 Power Cycle Symposium, May 24-25, 2011, Boulder, CO, 21 pages.
San Andres, Luis, "Start-Up Response of Fluid Film Lubricated Cryogenic Turbopumps (Preprint)", AIAA/ASME/SAE/ASEE Joint Propulsion Conference, Cincinnati, OH, Jul. 8-11, 2007, 38 pages.
Sarkar, J., and Bhattacharyya, Souvik, "Optimization of Recompression S-CO2 Power Cycle with Reheating" Energy Conversion and Management 50 (May 17, 2009), pp. 1939-1945.
Tom, Samsun Kwok Sun, "The Feasibility of Using Supercritical Carbon Dioxide as a Coolant for the Candu Reactor", The University of British Columbia, Jan. 1978, 156 pages.
VGB PowerTech Service GmbH, "CO2 Capture and Storage", A VGB Report on the State of the Art, Aug. 25, 2004, 112 pages.
Vidhi, Rachana, et al., "Study of Supercritical Carbon Dioxide Power Cycle for Power Conversion from Low Grade Heat Sources", Presentation, University of South Florida and Oak Ridge National Laboratory, Supercritical CO2 Power Cycle Symposium, May 24-25, 2011, Boulder, CO, 17 pages.
Vidhi, Rachana, et al., "Study of Supercritical Carbon Dioxide Power Cycle for Power Conversion from Low Grade Heat Sources", Paper, University of South Florida and Oak Ridge National Laboratory, Supercritical CO2 Power Cycle Symposium, May 24-25, 2011, Boulder, CO, 8 pages.
Wright, Steven A., et al., "Modeling and Experimental Results for Condensing Supercritical CO2 Power Cycles", Sandia Report, Jan. 2011, 47 pages.
Wright, Steven A., et al., "Supercritical CO2 Power Cycle Development Summary at Sandia National Laboratories", May 24-25, 2011, (1 page, Abstract only).
Wright, Steven, "Mighty Mite", Mechanical Engineering, Jan. 2012, pp. 41-43.
Yoon, Ho Joon, et al., "Preliminary Results of Optimal Pressure Ratio for Supercritical CO2 Brayton Cycle coupled with Small Modular Water Cooled Reactor", Presentation, Korea Advanced Institute of Science and Technology and Khalifa University of Science, Technology and Research, Boulder, CO, May 25, 2011, 18 pages.
Yoon, Ho Joon, et al., "Preliminary Results of Optimal Pressure Ratio for Supercritical CO2 Brayton Cycle coupled with Small Modular Water Cooled Reactor", Paper, Korea Advanced Institute of Science and Technology and Khalifa University of Science, Technology and Research, May 24-25, 2011, Boulder, CO, 7 pages.
Vaclav Dostal, Martin Kulhanek, "Research on the Supercritical Carbon Dioxide Cycles in the Czech Republic", Department of Fluid Mechanics and Power Engineering Czech Technical University in Prague, RPI, Troy, NY, Apr. 29-30, 2009; 8 pages.
CN Search Report for Application No. 201080035382.1, 2 pages.
CN Search Report for Application No. 201080050795.7, 2 pages.
PCT/US2011/062198—Extended European Search Report dated May 6, 2014, 9 pages.
PCT/US2011/062201—Extended European Search Report dated May 28, 2014, 8 pages.
PCT/US2013/055547—Notification of Transmittal of the International Search Report and the Written Opinion of the International Searching Authority, or the Declaration dated Jan. 24, 2014, 11 pages.
PCT/US2013/064470—Notification of Transmittal of the International Search Report and the Written Opinion of the International Searching Authority, or the Declaration dated Jan. 22, 2014, 10 pages.
PCT/US2013/064471—Notification of Transmittal of the International Search Report and the Written Opinion of the International Searching Authority, or the Declaration dated Jan. 24, 2014, 10 pages.
PCT/US2014/013154—International Search Report dated May 23, 2014, 4 pages.
PCT/US2014/013170—Notification of Transmittal of the International Search Report and the Written Opinion of the International Searching Authority, or the Declaration dated May 9, 2014, 12 pages.

(56) References Cited

OTHER PUBLICATIONS

PCT/US2014/023026—Notification of Transmittal of the International Search Report and the Written Opinion of the International Searching Authority, or the Declaration dated Jul. 22, 2014, 11 pages.
PCT/US2014/023990—Notification of Transmittal of the International Search Report and the Written Opinion of the International Searching Authority, or the Declaration dated Jul. 17, 2014, 10 pages.
PCT/US2014/026173—Notification of Transmittal of the International Search Report and the Written Opinion of the International Searching Authority, or the Declaration dated Jul. 9, 2014, 10 pages.
Renz, Manfred, "The New Generation Kalina Cycle", Contribution to the Conference: "Electricity Generation from Enhanced Geothermal Systems", Sep. 14, 2006, Strasbourg, France, 18 pages.
Thorin, Eva, "Power Cycles with Ammonia-Water Mixtures as Working Fluid", Doctoral Thesis, Department of Chemical Engineering and Technology Energy Processes, Royal Institute of Technology, Stockholm, Sweden, 2000, 66 pages.

CARBON DIOXIDE REFRIGERATION CYCLE

CROSS-REFERENCE TO RELATED APPLICATIONS

This application claims the benefit of U.S. Appl. No. 61/542,478, filed Oct. 3, 2011, which is hereby incorporated by reference.

BACKGROUND

Basic refrigeration systems cool a target fluid circulating through an evaporator where the latent heat of vaporization of a working fluid is obtained from the sensible heat of the target fluid, thereby reducing the temperature of the target fluid. In order for the working fluid to evaporate, the working fluid must first be in a liquid state at a pressure below the vapor pressure of the working fluid. In typical refrigeration cycles, this liquid state is obtained by compressing the working fluid to a high pressure and temperature, rejecting the thermal energy to the environment either by conduction or convection, and then passing the working fluid through a throttling valve to reduce the pressure of the working fluid in an isenthalpic expansion. The resulting liquid working fluid is then evaporated in the evaporator by absorbing thermal energy from the target fluid. The evaporated working fluid is then returned to the compressor to complete the cycle.

One disadvantage to this type of refrigeration system is that the compression system requires power in the form of expensive mechanical energy. An alternate way of compressing the working fluid is through the use of an ejector which uses a high pressure and temperature motive fluid to entrain the working fluid (e.g., a suction fluid) after the working fluid has been discharged from the evaporator. The fluid mixture discharged from the ejector follows the conventional refrigeration cycle before being re-entrained into the ejector by additional, high temperature motive fluid.

Although there are several types of refrigeration cycles that employ ejectors, it nonetheless remains desirable to find improved refrigeration cycles in varying thermodynamic applications that offer improved efficiency and reduction in production costs.

SUMMARY

Embodiments of the disclosure may provide a working fluid circuit for converting thermal energy into mechanical energy and/or electrical energy. The working fluid circuit may include a pump configured to circulate a working fluid through the working fluid circuit. A heat exchanger may be in fluid communication with the pump and in thermal communication with a heat source, and the heat exchanger may be configured to transfer thermal energy from the heat source to the working fluid. A condenser may be fluidly coupled to the pump and configured to cool the working fluid before returning to the pump for recirculation. An ejector may be fluidly coupled to the heat exchanger and configured to receive a motive fluid and a suction fluid. The motive fluid may be a portion of the working fluid discharged from the heat exchanger and the suction fluid may be a portion of the working fluid discharged from the condenser, and the ejector may discharge a mixed fluid into or adjacent an inlet of the condenser. An expansion valve may be fluidly coupled to the condenser and configured to receive and expand the suction fluid. An evaporator may be in fluid communication with the expansion valve and have a target fluid circulating therein. The evaporator may be configured to transfer thermal energy from the target fluid to the suction fluid such that the target fluid is cooled.

Embodiments of the disclosure may also provide a method for cooling a target fluid. The method may include circulating a working fluid through a working fluid circuit with a pump. The working fluid may be heated in a heat exchanger arranged in the working fluid circuit in fluid communication with the pump, and the heat exchanger may be in thermal communication with a waste heat source. The working fluid may be cooled with a condenser arranged in the working fluid circuit upstream from and fluidly coupled to the pump. A portion of the working fluid discharged from the heat exchanger may be extracted to be used as a motive fluid in an ejector, and the ejector may be fluidly coupled to the heat exchanger. A portion of the working fluid discharged from the condenser may be extracted to be used as a suction fluid in the ejector. The suction fluid may be expanded in an expansion valve to generate a cooled suction fluid, and the expansion valve may be fluidly coupled to the condenser. The target fluid may be cooled with the cooled suction fluid in an evaporator fluidly coupled to the expansion valve.

Embodiments of the disclosure may further provide a refrigeration cycle, such as a jet pump refrigeration cycle containing or otherwise utilizing a working fluid containing carbon dioxide. The refrigeration cycle may include an ejector fluidly coupled to a heat exchanger arranged in a working fluid circuit and configured to receive a motive fluid from the heat exchanger. The heat exchanger may be configured to transfer thermal energy from a waste heat source to a working fluid containing carbon dioxide circulating throughout the working fluid circuit, and the motive fluid is a portion of the working fluid discharged from the heat exchanger. A condenser may be arranged in the working fluid circuit and fluidly coupled to a discharge of the ejector, and the condenser may be configured cool the working fluid in the working fluid circuit and simultaneously cool a mixed fluid discharged from the ejector. An expansion valve may be fluidly coupled to the condenser and configured to receive and expand a suction fluid to generate a cooled suction fluid. The suction fluid may be a portion of the working fluid discharged from the condenser and subsequently entrained into the ejector to form part of the mixed fluid. An evaporator may be in fluid communication with the expansion valve and have a target fluid circulating therein. The evaporator may be configured to transfer thermal energy from the target fluid to the suction fluid such that the target fluid is cooled and the suction fluid evaporates. An upstream source may be fluidly coupled to the evaporator and provide the target fluid to the evaporator.

BRIEF DESCRIPTION OF THE DRAWINGS

Embodiments of the present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
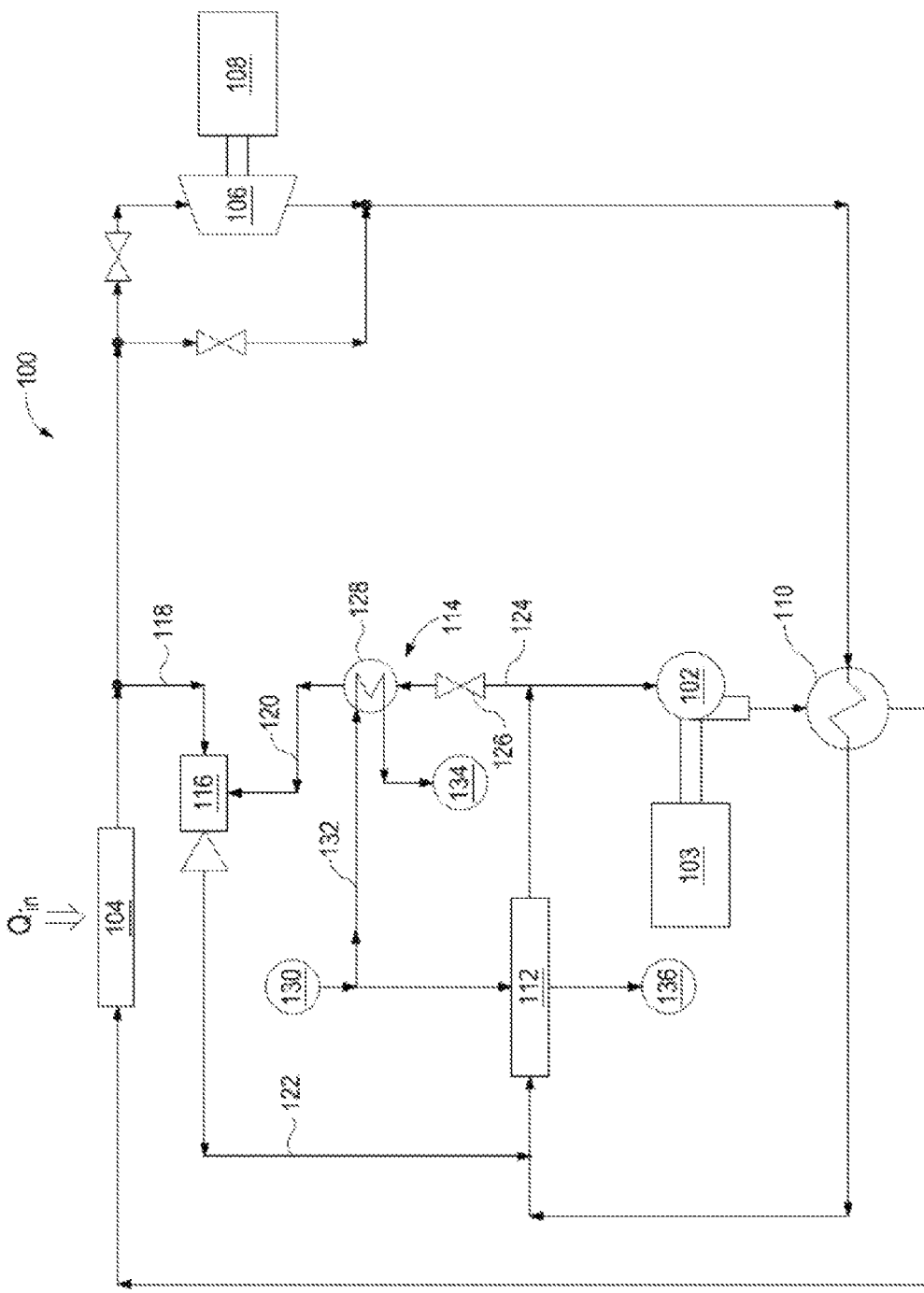
FIG. 1 illustrates a simple thermodynamic cycle working fluid circuit in conjunction with a refrigeration cycle, according to one or more embodiments disclosed herein.

It is to be understood that the present disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the present disclosure and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the present disclosure and in the claims, the terms "including" and "comprising" are used in an open-ended fashion, and thus should be interpreted to mean "including, but not limited to". All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a thermodynamic working fluid circuit 100, according to one or more embodiments described. The working fluid circuit 100, and the various other working fluid circuits discussed herein, may also be referred to as a heat engine or a thermal engine, a power generation device, a heat or waste heat recovery system, and/or a heat to electricity system. The working fluid circuit 100 may include one or more elements of a Rankine thermodynamic cycle configured to produce power from a wide range of thermal sources.

The working fluid circuit 100 may operate as a closed-loop thermodynamic cycle that circulates a working fluid throughout a variety of conduits adapted to interconnect the various components of the working fluid circuit 100. The working fluid circuit 100 in FIG. 1 may be characterized as a "simple" thermodynamic cycle, and may include a refrigeration cycle 114 that uses a portion of the working fluid from the working fluid circuit 100 to cool a target fluid that can be used in a separate system or duty.

In one or more embodiments, the working fluid used in the working fluid circuit 100 may be or contain carbon dioxide ($CO_2$), but not limited to carbon dioxide of any particular type, purity, or grade. For example, industrial grade carbon dioxide may be used without departing from the scope of the disclosure. In many examples, the working fluid contained within the working fluid circuit 100 contains carbon dioxide and may be in a supercritical state in at least one portion of the working fluid circuit. In other embodiments, the working fluid may be a binary, ternary, or other working fluid combination. One such fluid combination includes a liquid absorbent and carbon dioxide mixture enabling the combination to be pumped in a liquid state to high pressure with less energy input than required to compress carbon dioxide independently. In yet other embodiments, the working fluid may be a combination of carbon dioxide and one or more other miscible fluids. In yet other embodiments, the working fluid may be a combination of carbon dioxide and propane, or carbon dioxide and ammonia, without departing from the scope of the disclosure.

Use of the term "working fluid" is not intended to limit the state or phase of matter that the working fluid is in at any point in the working fluid circuit 100. For instance, the working fluid may be in a fluid phase, a gas phase, a supercritical state, a subcritical state or any other phase or state at any one or more points within the working fluid circuit 100 or thermodynamic cycle. In one or more embodiments, the working fluid is in a supercritical state over certain portions of the working fluid circuit 100 (e.g., a high pressure side) and in a subcritical state at other portions of the working fluid circuit 100 (e.g., a low pressure side). In many examples, the working fluid contains carbon dioxide, the working fluid is in a supercritical state (e.g., sc-$CO_2$) contained within the high pressure side of the working fluid circuit 100, and the working fluid is in a subcritical state (e.g., sub-$CO_7$) contained within the low pressure side of the working fluid circuit 100. In other embodiments, the entire thermodynamic cycle may be operated such that the working fluid is maintained in either a supercritical or subcritical state throughout the entire working fluid circuit 100.

In some embodiments, the high pressure side of the working fluid circuit 100 contains the working fluid (e.g., sc-$CO_2$) at a pressure of greater than 15 MPa, such as about 20 MPa or greater. For example, the high pressure side of the working fluid circuit 100 may have a pressure within a range from about 20 MPa to about 30 MPa, more narrowly within a range from about 21 MPa to about 25 MPa, and more narrowly within a range from about 22 MPa to about 24 MPa, such as about 23 MPa. The low pressure side of the working fluid circuit 100 contains the working fluid (e.g., sub-$CO_2$) at a pressure of less than 15 MPa, such as about 10 MPa or less. For example, the low pressure side of the working fluid circuit 100 may have a pressure within a range from about 2 MPa to about 10 MPa, more narrowly within a range from about 4 MPa to about 8 MPa, and more narrowly within a range from about 5 MPa to about 7 MPa, such as about 6 MPa.

A main pump 102 may be utilized to pressurize and circulate the working fluid within the working fluid circuit 100. In one embodiment, the main pump 102 is driven by a motor 103 or other comparable driving mechanism. The working fluid is directed through a heat exchanger 104 configured to increase the temperature of the working fluid. The heat exchanger 104 is in thermal communication with a heat source $Q_{in}$ which may derive thermal energy from a variety of high temperature sources.

For example, the heat source $Q_{in}$ may be a waste heat stream such as, but not limited to, gas turbine exhaust, process stream exhaust, or other combustion product exhaust streams, such as furnace or boiler exhaust streams. Accordingly, the working fluid circuit 100 may be configured to transform waste heat into electricity for applications ranging from bottom cycling in gas turbines, stationary diesel engine gensets, industrial waste heat recovery (e.g., in refineries and compression stations), and hybrid alternatives to the internal combustion engine. In some examples, the heat source $Q_{in}$ is a waste heat stream and the heat exchanger 104 is a waste heat exchanger. In other embodiments, the heat source $Q_{in}$ may derive thermal energy from renewable sources of thermal energy such as, but not limited to, solar thermal and geothermal sources.

While the heat source $Q_{in}$ may be a fluid stream of the high temperature source, in other embodiments the heat source $Q_{in}$ may be a thermal fluid that is in contact with the high temperature source. The thermal fluid may deliver the thermal energy to the heat exchanger 104 to transfer the energy to the working fluid in the working fluid circuit 100.

A first expansion device 106 is arranged downstream from the heat exchanger 104 for receiving and expanding the heated working fluid discharged from the heat exchanger 104. The first expansion device 106 may be any type of expansion device, such as an expander or a turbine, and may be operatively coupled to a work-producing device 108. The work-producing device 108 may be a pump, a compressor, an electrical generator, either coupled by a gearbox or directly driving corresponding high-speed alternators, or combinations thereof. The first expansion device 106 may be operable to discharge the working fluid into a first recuperator fluidly coupled downstream thereof. The first recuperator 110 may be configured to transfer residual thermal energy from the working fluid discharged from the first expansion device 106 to the working fluid discharged from the main pump 102. The working fluid discharged from the first recuperator 110 is then returned to a lower temperature state at a condenser 112 and then returned to the main pump 102 to commence the cycle anew.

The refrigeration cycle 114 may be fluidly coupled to the working fluid circuit 100 at one or more locations and adapted to use a portion of the working fluid circulating in the working fluid circuit 100 to cool a target fluid for use in a separate system or duty. The refrigeration cycle 114 may include an ejector 116 fluidly coupled to the working fluid circuit 100 via a first conduit 118, where the first conduit 118 redirects a portion of the working fluid to be used as a motive fluid for the ejector 116. As illustrated, the first conduit 118 may be tied into the working fluid circuit 100 at a location downstream from the heat exchanger 104 but prior to the first expansion device 106. Consequently, the motive fluid directed to the ejector 116 is working fluid discharged from the heat exchanger 104 at a generally high temperature and pressure.

The ejector 116 converts the pressure energy of the motive fluid into velocity energy, thereby creating a low pressure zone within the ejector 116. The low pressure zone effectively entrains a suction fluid into the ejector 116 via a second conduit 120 fluidly coupled thereto. As the mixed fluid (e.g., the motive fluid mixed with the suction fluid) traverses the ejector 116, the mixed fluid expands and the velocity is reduced, which has the effect of recompressing the mixed fluid by converting the velocity energy back into pressure energy. The mixed fluid discharged from the ejector 116 into a third conduit 122 which may be fluidly coupled to the working fluid circuit 100 upstream from the condenser 112, such as adjacent the inlet to the condenser 112.

The suction fluid entrained into the ejector 116 may also be obtained from the working fluid circuit 100 by redirecting a fraction of the working fluid downstream from the condenser 112 into a fourth conduit 124. An expansion valve 126 is arranged in the fourth conduit 124 for expanding the suction fluid extracted from the working fluid circuit 100. The expansion valve 126 may be any device adapted to expand a fluid, such as, but not limited to, a valve, an expander, a turbine, or the like. Expanding the suction fluid with the expansion valve 126 reduces the pressure and temperature of the suction fluid, and results in a suction fluid that is primarily in a liquid state. As can be appreciated, the resulting pressure and temperature of the suction fluid can be selectively varied by adjusting, positioning, or otherwise varying the relative position of the expansion valve 126 between open and closed positions.

The liquid suction fluid may then be directed through an evaporator 128 fluidly coupled to the discharge of the expansion valve 126. The evaporator 128 serves to transfer thermal energy between the suction fluid and a target fluid originating from an upstream source 130 such that the target fluid is cooled. The target fluid may be directed to the evaporator 128 via a fifth conduit 132. The evaporator 128 transfers thermal energy from the target fluid to the suction fluid, thereby reducing the temperature of the target fluid and simultaneously increasing the enthalpy of the suction fluid although the temperature of the suction fluid may or may not increase. Increasing the enthalpy of the suction fluid may cause the suction fluid to evaporate before the suction fluid is entrained into the ejector 116, as described above. The cooled target fluid may be discharged from the evaporator 128 and used or otherwise employed in a separate downstream system or the duty 134, such as another heat exchanging device of a downstream application that requires the use of cooled water.

In one or more embodiments, the target fluid may be a liquid or a gas, or any other known thermal fluid or heat transfer fluid. For example, the target fluid may be air, water, or a mixture of glycol and water. Although the upstream source 130 is shown as providing both the target fluid via the fifth conduit 132 and the coolant for the condenser 112, it may be appreciated that the coolant for the condenser 112 may originate from a different source, and thus, not be in fluid communication with the target fluid. After cooling the working fluid passing through the condenser 112, the coolant water may be directed to a cooling water return 136.

Figure 2:
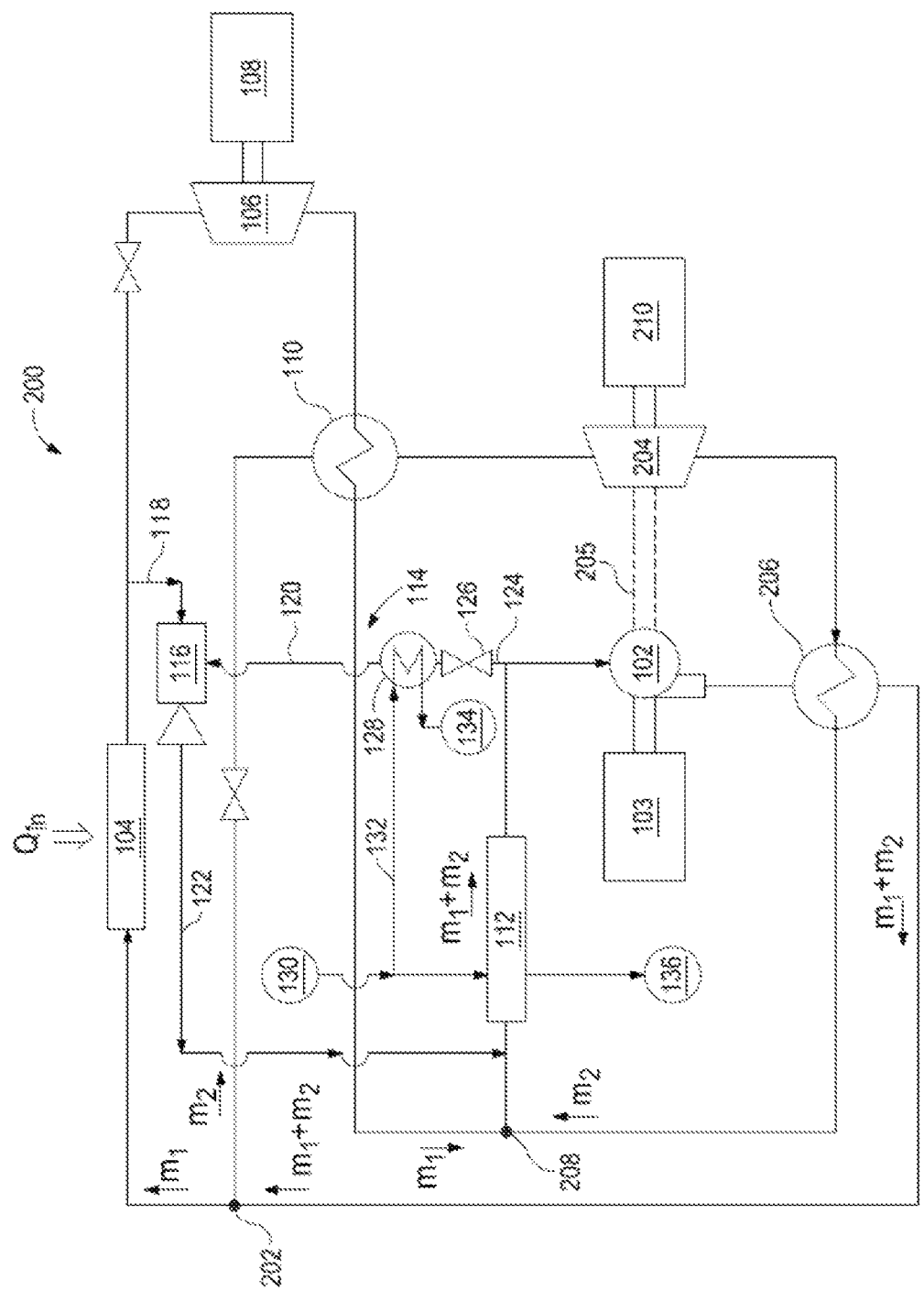
FIGS. 2 and 3 illustrate cascade-type thermodynamic cycle working fluid circuits in conjunction with a refrigeration cycle, according to one or more embodiments disclosed herein.
Figure 3:
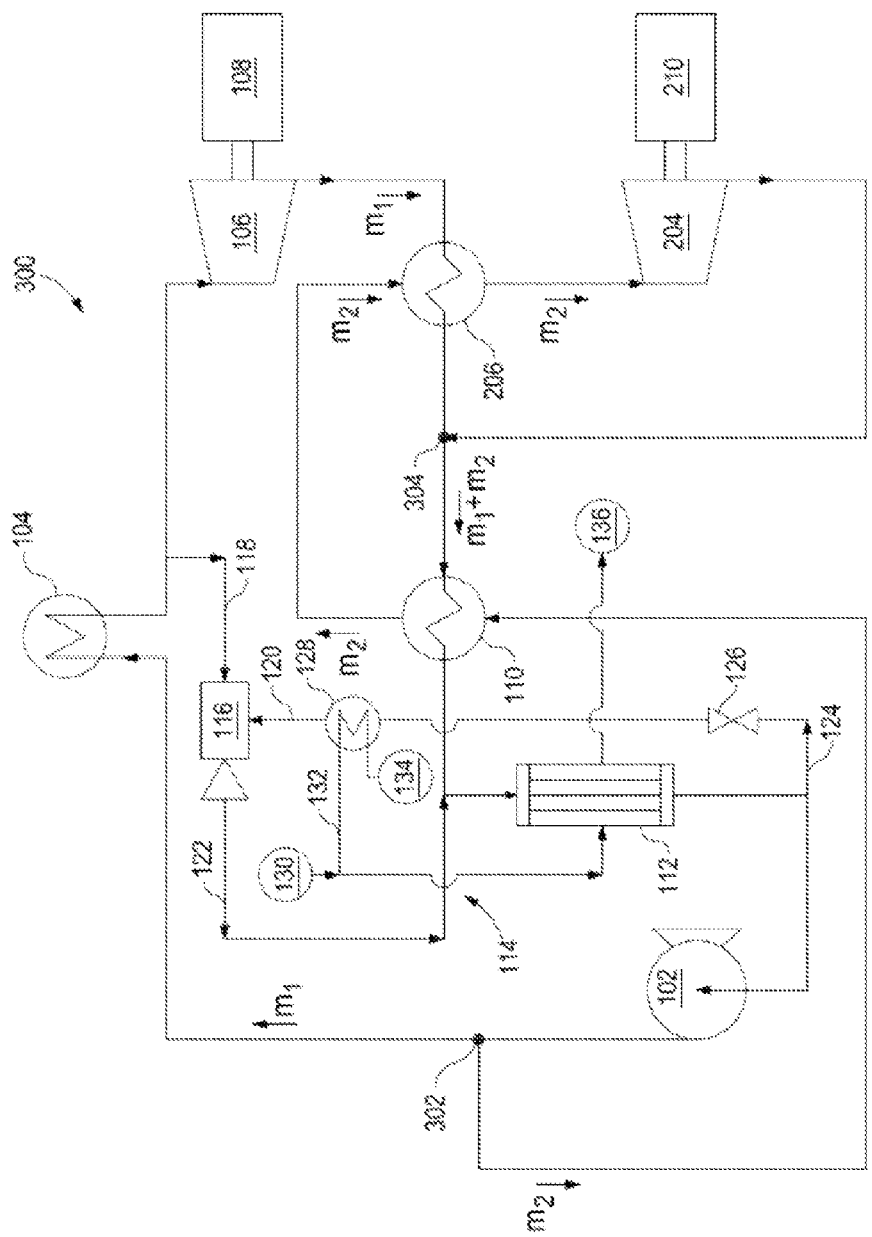

Referring now to FIGS. 2 and 3, illustrated are exemplary "cascade" thermodynamic cycles that may include the refrigeration cycle 114 generally described above for cooling a target fluid for use in the separate downstream system or the duty 134. It may be appreciated that the various cascade cycles illustrated in FIGS. 2 and 3 are not to be considered an exhaustive list of cascade cycles but only exemplary of various cascade cycles that may work in conjunction with the generally described refrigeration cycle 114. For instance, other exemplary cascade thermodynamic cycles that may also be used together with the refrigeration cycle 114 may be found in PCT Appl. No. US2011/029486, entitled "Heat Engines with Cascade Cycles" and filed on Mar. 22, 2011, and published as WO 2011-119650, which is hereby incorporated by reference.

FIG. 2 illustrates another working fluid circuit 200 similar in some respects to the working fluid circuit 100 described above. Accordingly, the working fluid circuit 200 may be best understood with reference to FIG. 1, where like numerals represent like components not described again in detail. As illustrated, the working fluid may be characterized as $m_1+m_2$, where $m_1$ is a first mass flow and $m_2$ is a second mass flow, but where each mass flow $m_1$, $m_2$ is part of the same working fluid mass coursing throughout the working fluid circuit 200. After being discharged from the main pump 102, the combined working fluid $m_1+m_2$ is split into the first and second mass flows $m_1$ and $m_2$, respectively, at point 202 in the working fluid circuit 200.

The first mass flow $m_1$ is directed though the heat exchanger 104 and subsequently expanded in the first expansion device 106, as described above. The first expansion device 106 discharges the first mass flow $m_1$ into the first recuperator 110 fluidly coupled downstream thereof. The first recuperator 110 may be configured to transfer residual thermal energy in the first mass flow $m_1$ to the second mass flow $m_2$ which also passes through the first recuperator 110. Consequently, the temperature of the first mass flow $m_1$ is decreased and the temperature of the second mass flow $m_2$ is increased. The second mass flow $m_2$ may be subsequently expanded in a second expansion device 204. The second expansion device 204 may be any type of expansion device, such as an expander or a turbine.

In one embodiment, the second expansion device 204 is operatively coupled to a second work-producing device 210, which may be similar to the work-producing device 108 described above. For example, the second work-producing device 210 may be a pump, a compressor, an electrical generator, either coupled by a gearbox or directly driving corresponding high-speed alternators, or combinations thereof. In other embodiments, the second work-producing device 210 may be omitted and the second expansion device 204 may be operatively coupled to the main pump 102 via a shaft 205. Accordingly, the main pump 102 may be driven by expansion of the second mass flow $m_2$ in the second expansion device 204.

The second expansion device 204 discharges the second mass flow $m_2$ into a second recuperator 206 fluidly coupled downstream thereof. The second recuperator 206 may be configured to transfer residual thermal energy from the second mass flow $m_2$ to the combined working fluid $m_1+m_2$ discharged from the main pump 102 and passing through the second recuperator 206. The mass flows $m_1$, $m_2$ discharged from each recuperator 110, 206, respectively, are recombined at point 208 in the working fluid circuit 200 and then returned to a lower temperature state at the condenser 112. After passing through the condenser 112, the combined working fluid $m_1+m_2$ is returned to the main pump 102 and the cycle is started anew.

The refrigeration cycle 114 is coupled to the working fluid circuit 200 adjacent the discharge of the heat exchanger 104 and directs motive fluid to the ejector 116 via the first conduit 118. The suction fluid derived from the second conduit 120 again originates from the working fluid circuit 200 at a location downstream from the condenser 112 via a fourth conduit 124. The third conduit 122 receives the mixed fluid as the mixed fluid is discharged from the ejector 116 and injects the mixed fluid into the working fluid circuit 200 upstream from the condenser 112, such as adjacent the inlet to the condenser 112.

Operation of the expansion valve 126 and the evaporator 128 in conjunction with the target fluid derived from the upstream source 130 is substantially similar as described above with reference to FIG. 1, and therefore will not be described again in detail. As with the embodiment shown in FIG. 1, the cooled target fluid may be discharged from the evaporator 128 and directed to the separate downstream system or the duty 134 that requires a cooled target fluid.

FIG. 3 illustrates another exemplary cascade thermodynamic cycle, including another working fluid circuit 300 that employs the refrigeration cycle 114 generally described above for cooling a target fluid to be used in the separate downstream system or the duty 134. The working fluid circuit 300 is generally similar to the previously-described working fluid circuits 100 and 200, and therefore FIG. 3 may be best understood with reference to FIGS. 1 and 2 where like numerals represent like components not described again in detail. Following the main pump 102, the working fluid may be separated at point 302 into the first mass flow $m_1$ and the second mass flow $m_2$. The first mass flow $m_1$ may be directed to the heat exchanger 104 and subsequently expanded in the first expansion device 106. Residual thermal energy in the first mass flow $m_1$ exhausted from the first expansion device 106 may be used to preheat the second mass flow $m_2$ in the second recuperator 206 prior to the second mass flow $m_2$ being expanded in the second expansion device 204.

After expansion in the second expansion device 204, the second mass flow $m_2$ may be re-combined with the first mass flow $m_1$ at point 304. The combined working fluid $m_1+m_2$ may then transfer thermal energy to the second mass flow $m_2$ via the first recuperator 110 prior to the second mass flow $m_2$ passing through the second recuperator 206, as described above. The combined working fluid $m_1+m_2$ is cooled via the first recuperator 110 and subsequently directed to the condenser 112 for additional cooling, after which the working fluid is generally returned to the main pump 102 where the cycle starts anew.

As with prior embodiments, the refrigeration cycle 114 is coupled to the working fluid circuit 300 adjacent the discharge of the heat exchanger 104 to provide high temperature and pressure motive fluid to the ejector 116 via the first conduit 118. The suction fluid derived from the second conduit 120 again originates from the working fluid circuit 300 at a location downstream from the condenser 112 via the fourth conduit 124. The third conduit 122 receives the mixed fluid discharged from the ejector 116 and injects the mixed fluid into the working fluid circuit 300 upstream from the condenser 112, such as adjacent the inlet to the condenser 112.

Operation of the expansion valve 126 and the evaporator 128 in conjunction with the target fluid derived from the upstream source 130 is comparable to the embodiments described above with reference to FIG. 1, and therefore will not be described again in detail. As with the embodiments shown in FIG. 1, the cooled target fluid may be discharged from the evaporator 128 and directed to the separate downstream system or the duty 134 that requires a cooled target fluid.

Referring now to FIGS. 4-8, illustrated are exemplary "parallel" thermodynamic cycles that may include the refrigeration cycle 114 generally described above for cooling a target fluid for use in the separate downstream system or the duty 134. Similar to the cascade-type cycles shown above in FIGS. 2 and 3, it will be appreciated that the various parallel cycles illustrated in FIGS. 4-8 are not to be considered an exhaustive list of parallel thermodynamic cycles but only exemplary of various parallel cycles that may work in conjunction with the generally described refrigeration cycle 114. Additional examples of parallel thermodynamic cycles that may equally be used in the present disclosure in conjunction with the refrigeration cycle may be found in U.S. application Ser. No. 13/212,631, filed on Aug. 18, 2011, and published as US 2012-0131920, and in U.S. Provisional Appl. No. 61/417,789, entitled "Parallel Cycle Heat Engines", and filed on Nov. 29, 2010, which are hereby incorporated by reference to the extent consistent with the present disclosure.

Figure 4:
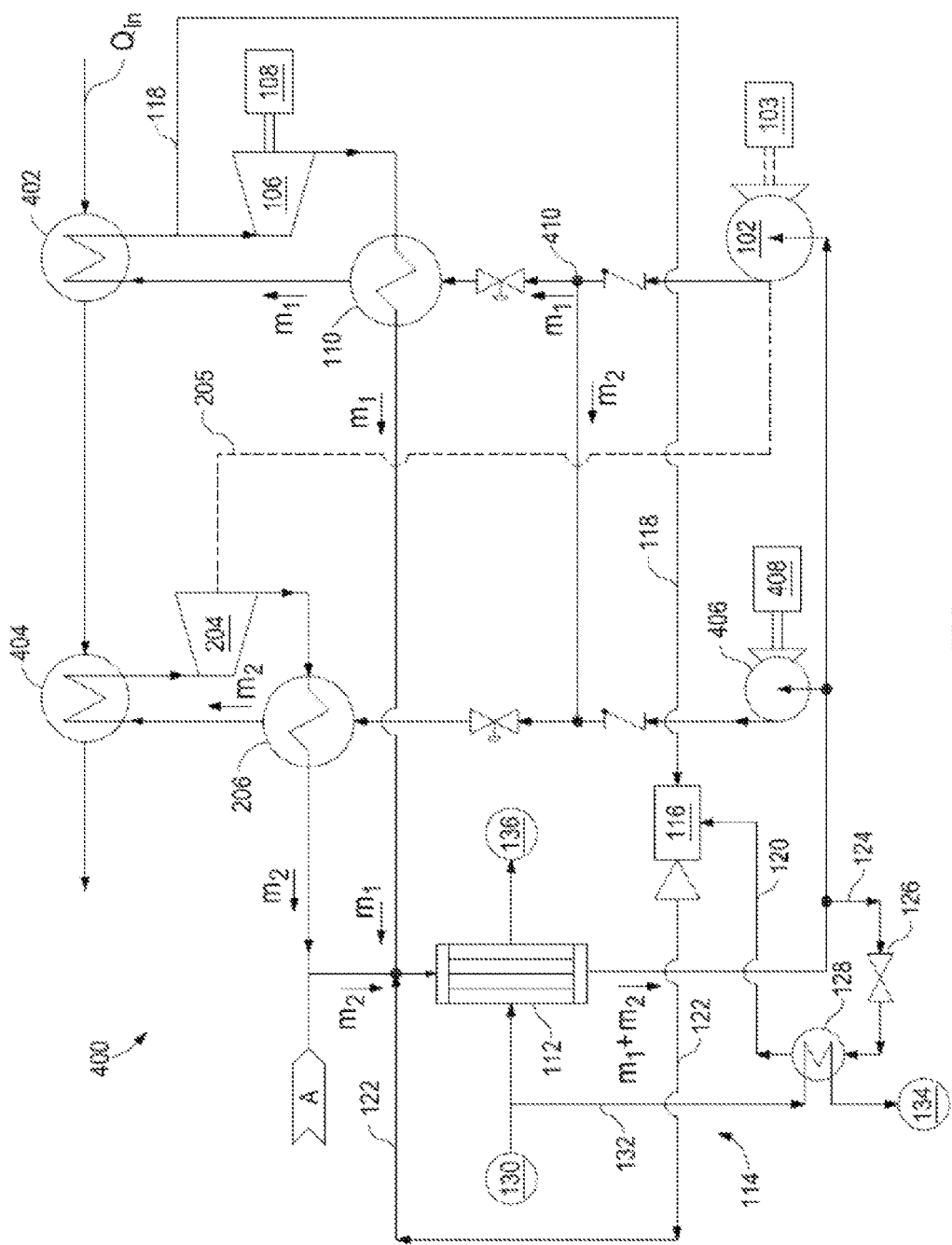
FIGS. 4-8 illustrate parallel-type thermodynamic cycle working fluid circuits in conjunction with a refrigeration cycle, according to one or more embodiments disclosed herein.

FIG. 4 illustrates an exemplary working fluid circuit 400 similar in some respects to the working fluid circuits 100-300 described above. Accordingly, the working fluid circuit 400 may be best understood with reference to FIGS. 1-3, where like numerals represent like components not described again in detail. As with prior-described working fluid circuits, the working fluid circuit 400 may be used to convert thermal energy to work by thermal expansion of a working fluid mass. Specifically, the working fluid circuit 400 may include a first heat exchanger 402 and a second heat exchanger 404 arranged in thermal communication with the heat source $Q_{in}$. The first and second heat exchangers 402, 404 may correspond generally to the heat exchanger 104 described above with reference to FIGS. 1-3. For instance, in one embodiment, the first and second heat exchangers 402, 404 may be first and second stages, respectively, of a single or combined heat exchanger. The first heat exchanger 402 may serve as a high temperature heat exchanger (e.g., a higher temperature relative to the second heat exchanger 404) adapted to receive initial thermal energy from the heat source $Q_{in}$. The second heat exchanger 404 may then receive additional or residual thermal energy from the heat source $Q_{in}$ via a serial connection downstream from the first heat exchanger 402.

As illustrated, the heat exchangers 402, 404 are arranged in series within the heat source $Q_{in}$, but in parallel in the working fluid circuit 400. The first heat exchanger 402 may be fluidly coupled to the first expansion device 106 and the second heat exchanger 404 may be fluidly coupled to the second expansion device 204. In turn, the first expansion device 106 is fluidly coupled to the first recuperator 110 and the second expansion device 204 is fluidly coupled to the second recuperator 206. The recuperators 110, 206 may be arranged in series on a low temperature side of the working fluid circuit 400 and in parallel on a high temperature side of the working fluid circuit 400. For example, the high temperature side of the working fluid circuit 400 includes the portions of the working fluid circuit 400 arranged downstream from each recuperator 110, 206 where the working fluid is directed to the heat exchangers 402, 404. The low temperature side of the working fluid circuit 400 includes the portions of the working fluid circuit 400 downstream from each recuperator 110, 206 where the working fluid is directed away from the heat exchangers 402, 404.

The main pump 102 may be operatively coupled to the second expansion device 204 via the shaft 205 (indicated by the dashed line), but in other embodiments the main pump 102 is driven by the motor 103, as described above. In embodiments where the second expansion device 204 drives the main pump 102 via the shaft 205, a starter pump 406 may be included in the working fluid circuit 400 to facilitate the start sequence for the combination of the main pump 102 and second expansion device 204 (e.g., a combination turbopump). The starter pump 406 may be driven primarily by an auxiliary motor 408, and once steady-state operation of the second expansion device 204 is reached, the starter pump 406 may be deactivated.

The first expansion device 106 may operate at a higher relative temperature (e.g., higher inlet temperature) than the second expansion device 204, due to the temperature drop of the heat source $Q_{in}$ realized across the first heat exchanger 402. Each expansion device 106, 204, however, may be configured to operate at the same or substantially the same inlet pressure. The low-pressure discharge mass flow exiting each recuperator 110, 206 may be directed to the condenser 112 to be cooled for return to either the main pump 102 or the starter pump 406, depending on the stage of operation.

During steady-state operation, the main pump 102 circulates the working fluid throughout the working fluid circuit 400, and the working fluid is separated into the first and second mass flows $m_1$, $m_2$ at point 410. The first mass flow $m_1$ is directed through the first heat exchanger 402 and subsequently expanded in the first expansion device 106. Following the first expansion device 106, the first mass flow $m_1$ passes through the first recuperator 110 and transfers residual thermal energy to the first mass flow $m_1$ as the first mass flow $m_1$ is directed toward the first heat exchanger 402.

The second mass flow $m_2$ is directed through the second heat exchanger 404 and subsequently expanded in the second expansion device 204. Following the second expansion device 204, the second mass flow $m_2$ passes through the second recuperator 206 to receive residual thermal energy from the second mass flow $m_2$ coursing towards the second heat exchanger 404. The second mass flow $m_2$ is then re-combined with the first mass flow $m_1$ and the combined mass flow $m_1+m_2$ is subsequently cooled in the condenser 112 and directed back to the main pump 102 to commence the working fluid circuit 400 anew.

The refrigeration cycle 114 is coupled to the working fluid circuit 400 adjacent the discharge of the first heat exchanger 402 to provide high temperature and pressure motive fluid to the ejector 116 via the first conduit 118. In other embodiments, the first conduit 118 may be coupled to the working fluid circuit 400 at or near the discharge of the second heat exchanger 404, without departing from the scope of the disclosure. The suction fluid entrained into the ejector 116 via the second conduit 120 may again originate from the working fluid circuit 400 at a location downstream from the condenser 112 via the fourth conduit 124. The third conduit 122 receives the mixed fluid discharged from the ejector 116 and injects the mixed fluid back into the working fluid circuit 400 at a location upstream from the condenser 112.

Operation of the expansion valve 126 and the evaporator 128 in conjunction with the target fluid derived from the upstream source 130 is substantially similar as described above with reference to FIG. 1, and therefore will not be described again in detail. As with prior embodiments, the cooled target fluid is discharged from the evaporator 128 and directed to the separate downstream system or the duty 134 requiring a cooled target fluid.

Figure 5:
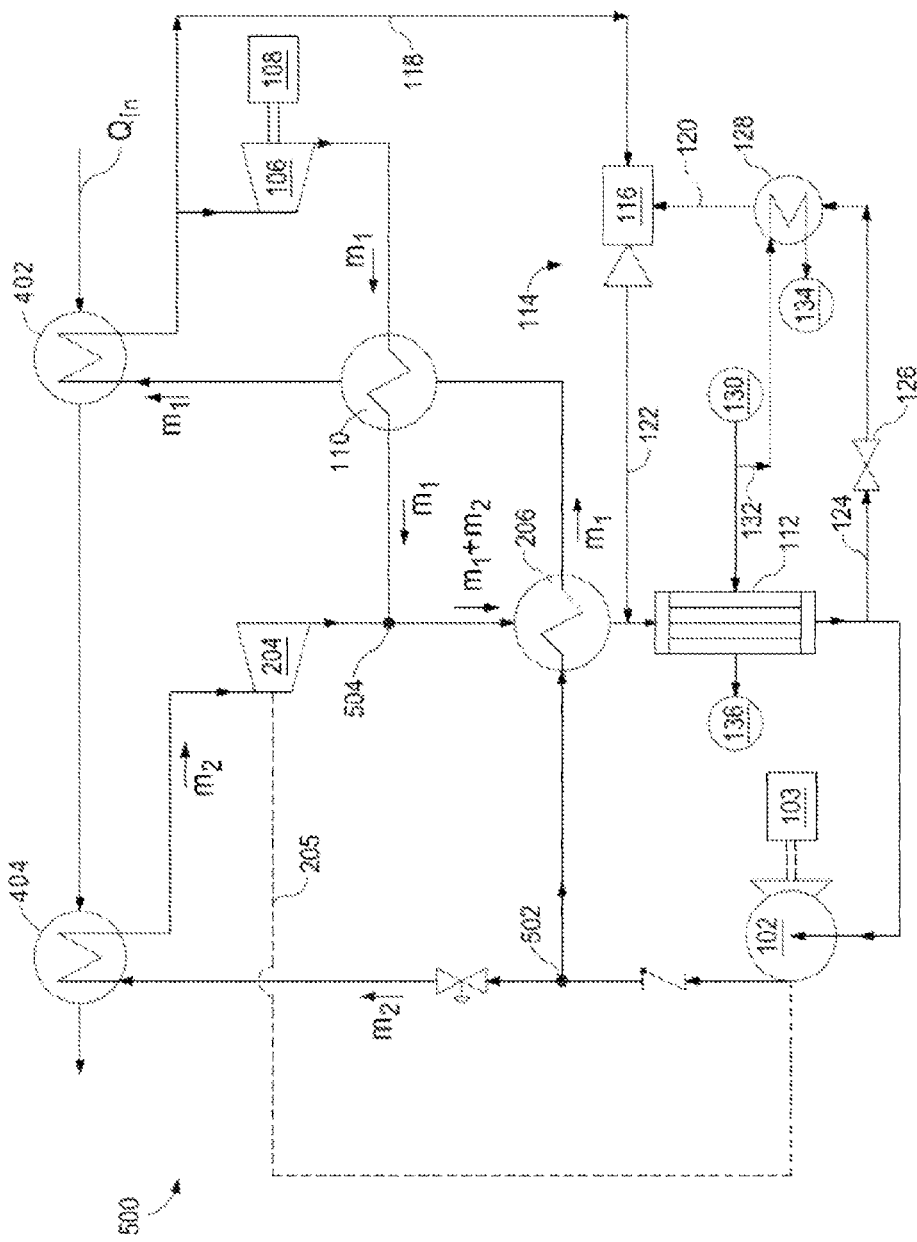

FIG. 5 illustrates another exemplary parallel thermodynamic cycle, including another working fluid circuit 500 that employs the refrigeration cycle 114 generally described above. The working fluid circuit 500 is generally similar to the working fluid circuit 400, and therefore FIG. 5 may be best understood with reference to FIGS. 1 and 4, where like numerals represent like components not described again in detail. The working fluid circuit 500 includes the first and second heat exchangers 402, 404 again arranged in series in thermal communication with the heat source $Q_{in}$, and arranged in parallel within the working fluid circuit 500.

In the working fluid circuit 500, the working fluid is separated into the first mass flow $m_1$ and the second mass flow $m_2$ at a point 502. The first mass flow $m_1$ is eventually directed through the first heat exchanger 402 and subsequently expanded in the first expansion device 106. The first mass flow $m_1$ then passes through the first recuperator 110 to transfer residual thermal energy back to the first mass flow $m_1$ coursing towards the first heat exchanger 402. The second mass flow $m_2$ may be directed through the second heat exchanger 404 and subsequently expanded in the second expansion device 204. Following the second expansion device 204, the second mass flow $m_2$ is merged with the first mass flow $m_1$ at point 504 to generate the combined working fluid flow $m_1+m_2$. The combined working fluid flow $m_1+m_2$ may be directed through the second recuperator 206 to transfer residual thermal energy to the first mass flow $m_1$ as the fluid passes through the second recuperator 206 on the way to the first recuperator 110.

The arrangement of the recuperators 110, 206 allows the residual thermal energy in the combined working fluid flow $m_1+m_2$ to be transferred to the first mass flow $m_1$ in the second recuperator 206 prior to the combined working fluid flow $m_1+m_2$ reaching the condenser 112. Following the condenser 112, the working fluid flow $m_1+m_2$ returns to the main pump 102 to commence the cycle anew.

Similar to the working fluid circuit 400, the refrigeration cycle 114 may be coupled to the working fluid circuit 500 adjacent the discharge of the first heat exchanger 402 to provide the motive fluid for the ejector 116 via the first conduit 118. In other embodiments, the first conduit 118 may be coupled to the working fluid circuit 400 at or near the discharge of the second heat exchanger 404. The suction fluid entrained into the ejector 116 via the second conduit 120 may originate from the working fluid circuit 500 at a location downstream from the condenser 112 via the fourth conduit 124. The third conduit 122 receives the mixed fluid discharged from the ejector 116 and injects the mixed fluid back into the working fluid circuit 500 at a location upstream from the condenser 112. Operation of the expansion valve 126 and the evaporator 128 in conjunction with the target fluid derived from the upstream source 130 is substantially similar as described above, and therefore will not be described again. As with prior embodiments, the cooled target fluid is discharged from the evaporator 128 and directed to the separate downstream system or the duty 134 requiring cooled target fluid.

Figure 6:
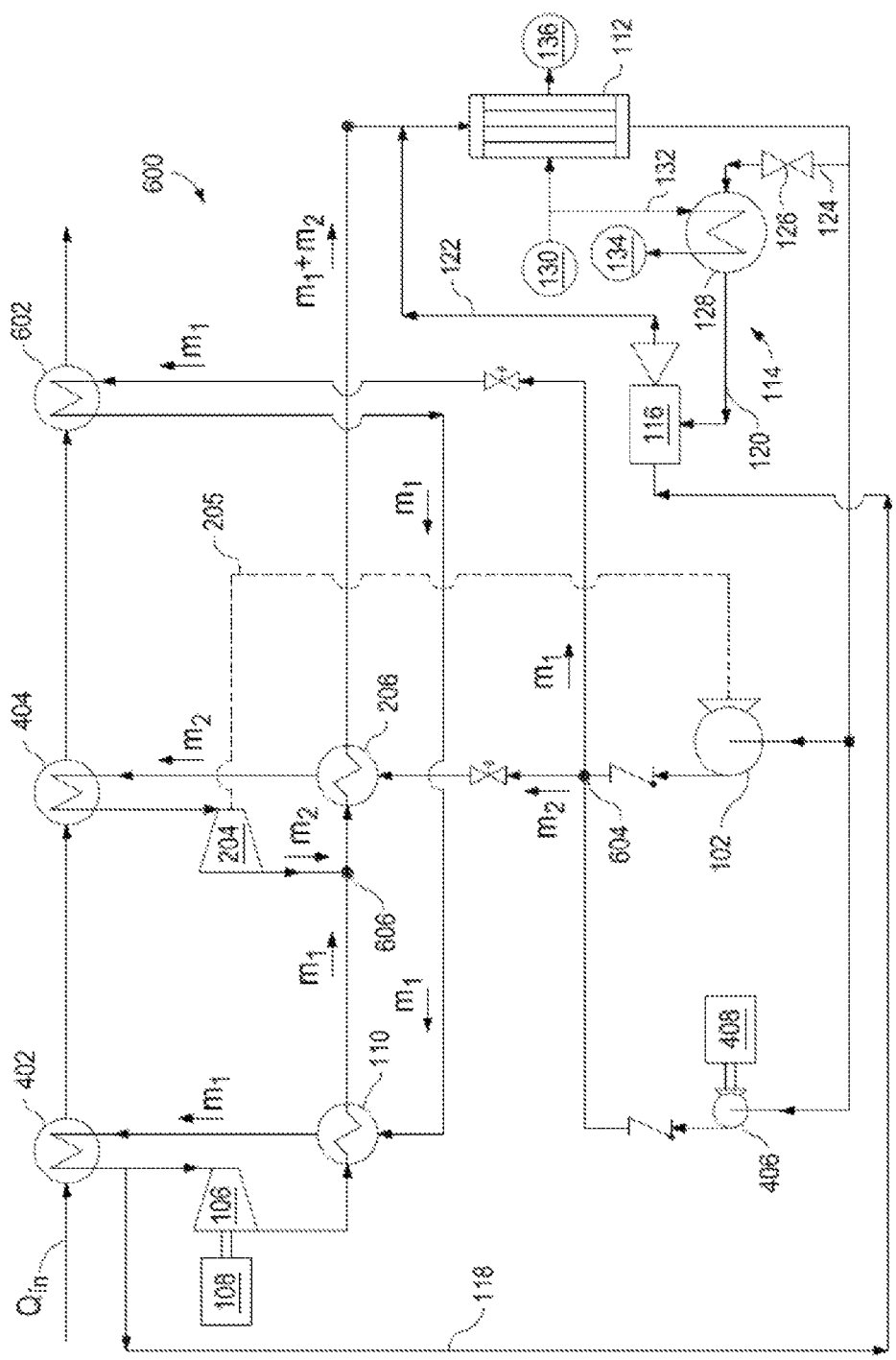

FIG. 6 illustrates another exemplary parallel thermodynamic cycle, including another working fluid circuit 600 that employs the refrigeration cycle 114 generally described above. The working fluid circuit 600 is generally similar to the working fluid circuits 400 and 500, and therefore the working fluid circuit 600 may be best understood with reference to FIGS. 1, 4, and 5, where like numerals represent like components not described again in detail. The working fluid circuit 600 includes a third heat exchanger 602 also in thermal communication with the heat source $Q_{in}$. The heat exchangers 402, 404, 602 are arranged in series within the heat source $Q_{in}$, but arranged in parallel in the working fluid circuit 302.

During steady-state operation of the working fluid circuit 600, the main pump 102 discharges the working fluid that is subsequently separated into first and second mass flows $m_1$, $m_2$, respectively, at point 604. The third heat exchanger 602 may be configured to transfer thermal energy from the heat source $Q_{in}$ to the first mass flow $m_1$ flowing therethrough. The first mass flow $m_1$ is then directed to the first heat exchanger 402 and the first expansion device 106 for expansion power generation. Following expansion in the first expansion device 106, the first mass flow $m_1$ passes through the first recuperator 110 to transfer residual thermal energy to the first mass flow $m_1$ discharged from the third heat exchanger 602 and coursing towards the first heat exchanger 402.

The second mass flow $m_2$ is directed through the second heat exchanger 404 and subsequently expanded in the second expansion device 204 to optionally drive the main pump 102 via the shaft 205. After being discharged from the second expansion device 204, the second mass flow $m_2$ merges with the first mass flow $m_1$ at point 606. The combined mass flow $m_1+m_2$ thereafter passes through the second recuperator 206 to provide residual thermal energy to the second mass flow $m_2$ as the second mass flow $m_2$ courses toward the second heat exchanger 404. The condenser 112 receives the combined mass flow $m_1+m_2$ discharged from the second recuperator 206 and the cycle is started anew at the main pump 102.

The refrigeration cycle 114 may be coupled to the working fluid circuit 600 at or adjacent the discharge of the first heat exchanger 402 to provide the motive fluid for the ejector 116 via the first conduit 118. In other embodiments, the first conduit 118 may be coupled to the working fluid circuit 400 at or near the discharge of the second or third heat exchangers 404, 602, respectively, without departing from the scope of the disclosure. The suction fluid entrained into the ejector 116 via the second conduit 120 may originate from the working fluid circuit 600 at a location downstream from the condenser 112 via the fourth conduit 124. The third conduit 122 receives the mixed fluid discharged from the ejector 116 and injects the mixed fluid back into the working fluid circuit 600 at a location upstream from the condenser 112. Operation of the expansion valve 126 and the evaporator 128 in conjunction with the target fluid derived from the upstream source 130 is the same as described above, and the cooled target fluid is discharged from the evaporator 128 to be used in the separate downstream system or the duty 134 requiring cooled target fluid.

Figure 7:
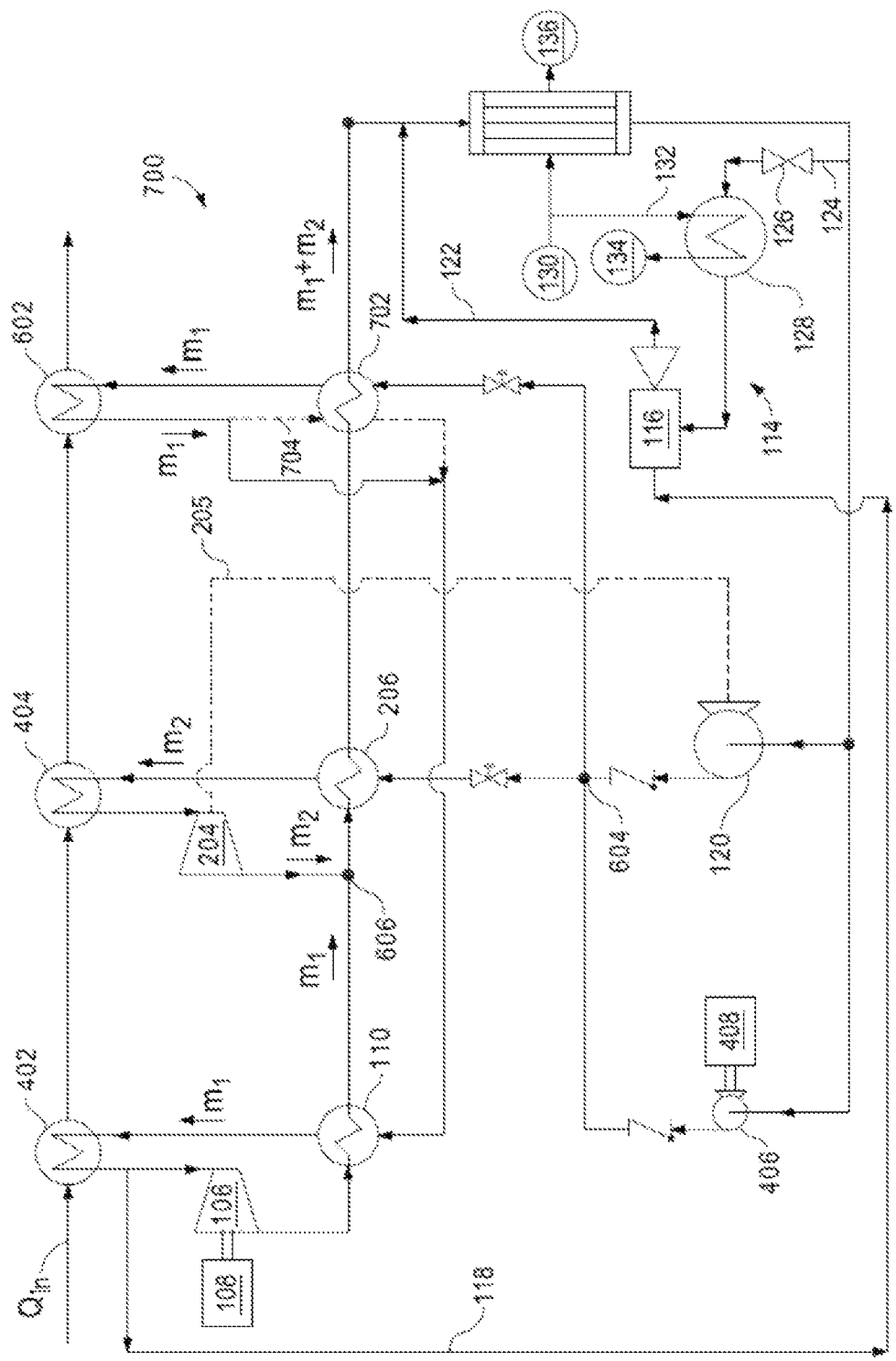

FIG. 7 illustrates another exemplary parallel thermodynamic cycle, including another working fluid circuit 700 that employs the refrigeration cycle 114 generally described above. The working fluid circuit 700 is generally similar to the working fluid circuit 600, and therefore the working fluid circuit 700 may be best understood with reference to FIGS. 1 and 6, where like numerals represent like components not described again in detail. The working fluid circuit 700 includes an additional, third recuperator 702 adapted to extract additional thermal energy from the combined mass flow $m_1+m_2$ discharged from the second recuperator 206. Accordingly, the temperature of the first mass flow $m_1$ entering the third heat exchanger 602 may be preheated in the third recuperator 702 prior to receiving thermal energy transferred from the heat source $Q_{in}$.

In other embodiments, the first mass flow $m_1$ discharged from the third heat exchanger 602 may be directed back through the third recuperator 702 via line 704 before the first mass flow $m_1$ is channeled to the first heat exchanger 402. Accordingly, the temperature of the first mass flow $m_1$ may be increased further prior to receiving thermal energy transferred from the first recuperator 110 and the heat source $Q_{in}$ in the first heat exchanger 402. As illustrated, the recuperators 110, 206, 702 may operate as separate heat exchanging devices. However, in other embodiments, the recuperators 110, 206, 702 may be combined as a single, integral recuperator. Steady-state operation of the working fluid circuit 700, including the integration of the refrigeration cycle 114, may operate substantially similar as described above in FIG. 6, and therefore will not be described again.

Figure 8:
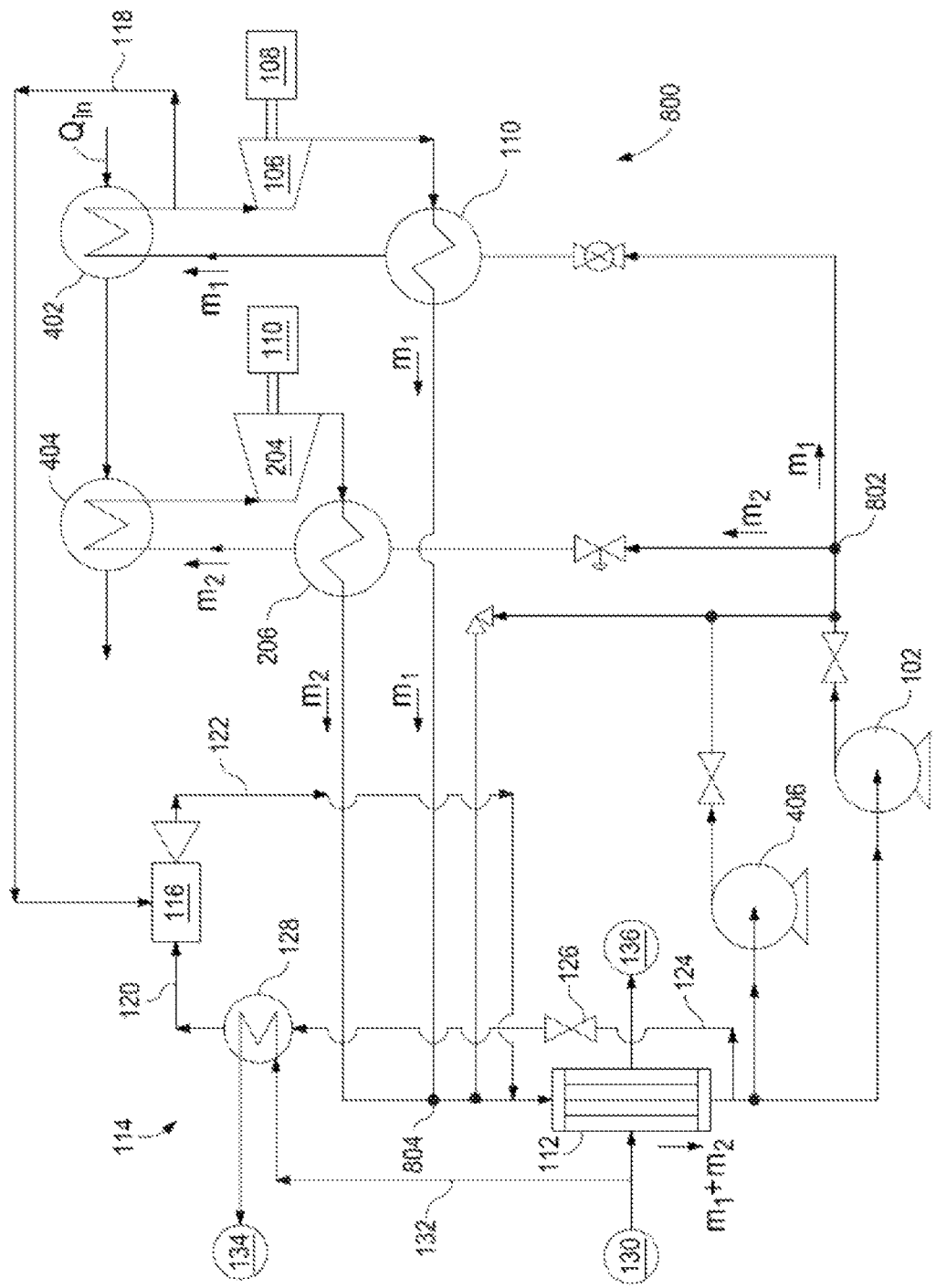

FIG. 8 is another exemplary parallel thermodynamic cycle that includes a working fluid circuit 800 that employs the refrigeration cycle 114 generally described above. The working fluid circuit 800 is similar to the previously-described working fluid circuits 400 and 500, and therefore the working fluid circuit 800 may be best understood with reference to FIGS. 1, 4, and 5, where like numerals represent like components not described again.

The working fluid is separated into first and second mass flows $m_1$ and $m_2$ at point 802 in the working fluid circuit 800. The first mass flow $m_1$ is eventually directed through the first heat exchanger 402 and subsequently expanded in the first expansion device 106. Upon discharge from the first expansion device 106, the first mass flow $m_1$ passes through the first recuperator 110 to transfer residual thermal energy back to the first mass flow $m_1$ coursing towards the first heat exchanger 402. The second mass flow $m_2$ may be directed through the second heat exchanger 404 and subsequently expanded in the second expansion device 204. Upon discharge from the second expansion device 204, the second mass flow $m_2$ passes through the second recuperator 206 to transfer residual thermal energy back to the second mass flow $m_2$ coursing towards the second heat exchanger 404. The first and second mass flows $m_1$, $m_2$ are re-combined at point 804 to generate the combined working fluid flow $m_1+m_2$. The combined working fluid flow $m_1+m_2$ may be directed through the condenser 112 and return to the main pump 102 to start the cycle anew.

The refrigeration cycle 114 may be coupled to the working fluid circuit 800 adjacent the discharge of the first heat exchanger 402 to provide the motive fluid for the ejector 116 via the first conduit 118. In other embodiments, the first conduit 118 may be coupled to the working fluid circuit 800 at or near the discharge of the second heat exchanger 404, without departing from the scope of the disclosure. The suction fluid entrained into the ejector 116 via the second conduit 120 may originate from the working fluid circuit 800 at a location downstream from the condenser 112 via the fourth conduit 124. The third conduit 122 receives the mixed fluid discharged from the ejector 116 and injects the mixed fluid back into the working fluid circuit 800 at a location upstream from the condenser 112. Operation of the expansion valve 126 and the evaporator 128 in conjunction with the target fluid derived from the upstream source 130 is substantially similar as described above. As with prior embodiments, the cooled target fluid from the fifth conduit 132 is discharged from the evaporator 128 and directed to the separate downstream system or the duty 134 requiring cooled target fluid.

Each of the described working fluid circuits 100-800 depicted in FIGS. 1-8 may be implemented in a variety of physical embodiments including, but not limited to, fixed or integrated installations, or as a self-contained device such as a portable waste heat engine "skid". The waste heat engine skid may be configured to arrange each of the working fluid circuits 100-800 and related components (e.g., expansion devices 106, 204, recuperators 110, 206, 702, condenser 112, and/or pumps 102, 406) in a consolidated, single unit. An exemplary waste heat engine skid is described and illustrated in U.S. application Ser. No. 12/631,412, filed on Dec. 9, 2009, and published as US 2011-0185729, which is hereby incorporated by reference to the extent consistent with the present disclosure.

Figure 9:
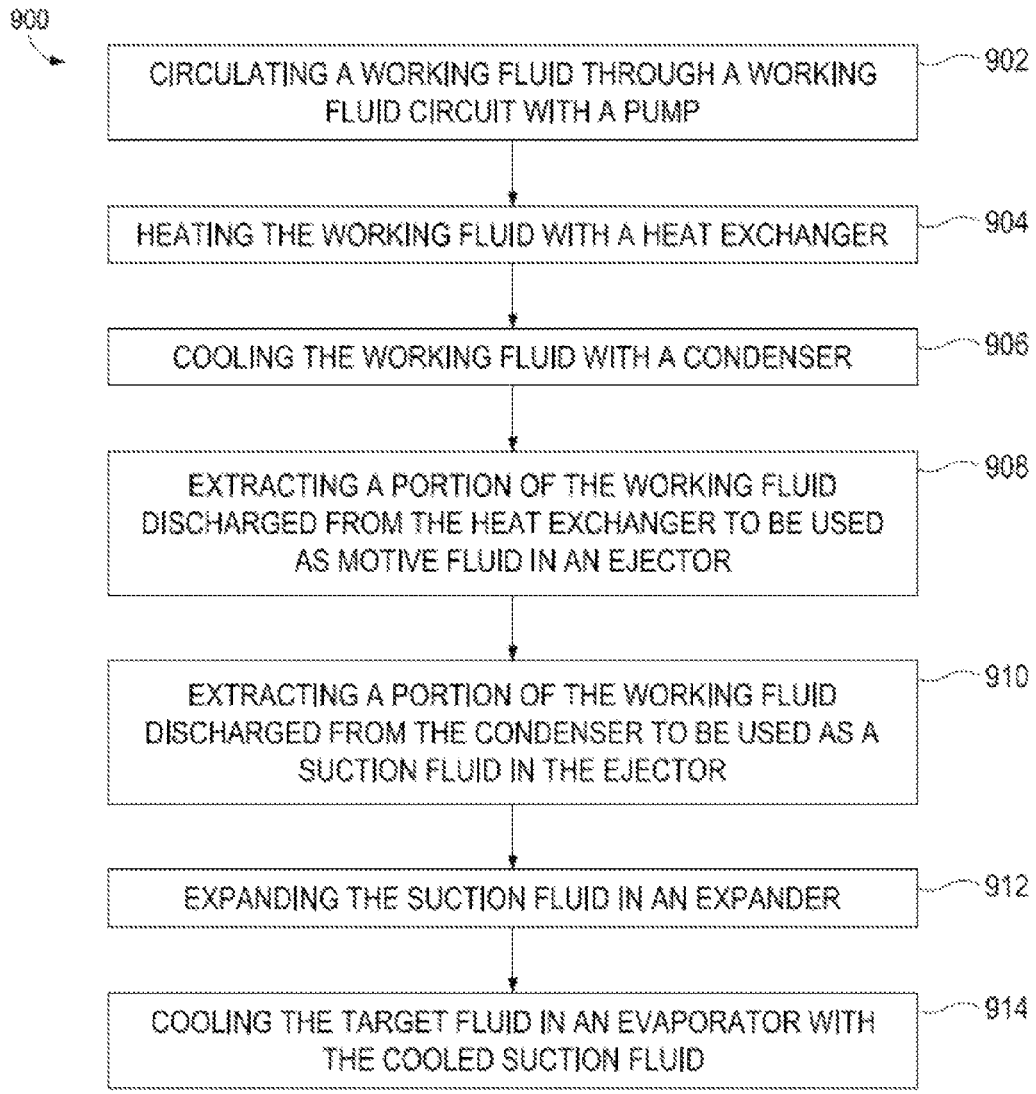
FIG. 9 is a schematic of a method for cooling a target fluid, according to one or more embodiments disclosed herein.

FIG. 9 illustrates a flowchart of a method 900 for cooling a target fluid as disclosed in another embodiment herein. The method 900 may include circulating a working fluid through a working fluid circuit with a pump, such as at 902. The working fluid may be heated in a heat exchanger arranged in the working fluid circuit in fluid communication with the pump, as at 904. The heat exchanger may be in thermal communication with a waste heat source in order to provide thermal energy to the working fluid. The method 900 may further include cooling the working fluid with a condenser, as at 906. The condenser may be arranged in the working fluid circuit upstream from and fluidly coupled to the pump.

A portion of the working fluid discharged from the heat exchanger may be extracted to be used as a motive fluid in an ejector, as at 908. The ejector may be fluidly coupled to the heat exchanger. Also, a portion of the working fluid discharged from the condenser may be extracted to be used as a suction fluid in the ejector, as at 910. The suction fluid may then be expanded in an expansion valve to generate a cooled suction fluid, as at 912. The expansion valve may be fluidly coupled to the condenser. The method 900 may further include cooling the target fluid with the cooled suction fluid in an evaporator, as at 914. The evaporator may be fluidly coupled to the expansion valve.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A working fluid circuit for converting thermal energy into mechanical energy, comprising:
    a pump configured to circulate a working fluid through the working fluid circuit;
    a heat exchanger in fluid communication with the pump and in thermal communication with a heat source, the heat exchanger being configured to transfer thermal energy from the heat source to the working fluid;
    a condenser fluidly coupled to the pump and configured to cool the working fluid before returning the working fluid to the pump for recirculation;
    an ejector fluidly coupled to the heat exchanger and configured to receive a motive fluid and a suction fluid, the motive fluid being a portion of the working fluid discharged from the heat exchanger and the suction fluid being a portion of the working fluid discharged from the condenser, wherein the ejector discharges a mixed fluid into or adjacent an inlet of the condenser;
    an expansion valve fluidly coupled to the condenser and configured to receive and expand the suction fluid; and
    an evaporator in fluid communication with the expansion valve and having a target fluid circulating therein, the evaporator configured to transfer thermal energy from the target fluid to the suction fluid while cooling the target fluid.

2. The working fluid circuit of claim 1, wherein the working fluid comprises carbon dioxide.

3. The working fluid circuit of claim 1, wherein the heat source comprises a waste heat source.

4. The working fluid circuit of claim 1, wherein the target fluid originates from an upstream source used primarily to cool the working fluid in the condenser.

5. The working fluid circuit of claim 4, wherein the upstream source comprises water.

6. The working fluid circuit of claim 4, wherein the upstream source is in a liquid state or a gas state.

7. The working fluid circuit of claim 1, further comprising:
    an expansion device fluidly coupled to the heat exchanger for expanding the working fluid discharged from the heat exchanger; and
    a recuperator fluidly coupled to the expansion device and configured to transfer thermal energy from the working fluid discharged from the expansion device to the working fluid discharged from the pump.

8. The working fluid circuit of claim 1, further comprising a first mass flow of the working fluid separated from a second mass flow of the working fluid within the working fluid circuit, the heat exchanger receiving the first mass flow and the working fluid circuit further comprising:

a first expansion device fluidly coupled to the heat exchanger and configured to receive and expand the first mass flow discharged from the heat exchanger;
a first recuperator fluidly coupled to the first expansion device and configured to receive the first mass flow discharged from the first expansion device and transfer residual thermal energy from the first mass flow to the second mass flow;
a second expansion device in fluid communication with the first recuperator and configured to receive and expand the second mass flow; and
a second recuperator fluidly coupled to the second expansion device and configured to receive the second mass flow discharged from the second expansion device.

9. The working fluid circuit of claim 1, further comprising a first mass flow of the working fluid separated from a second mass flow of the working fluid within the working fluid circuit, wherein the heat exchanger is a first heat exchanger configured to receive and transfer thermal energy to the first mass flow, the working fluid circuit further comprising:
a first expansion device fluidly coupled to the first heat exchanger and configured to expand the first mass flow;
a first recuperator fluidly coupled to the first expansion device and configured to transfer residual thermal energy from the first mass flow discharged from the first expansion device to the first mass flow directed to the first heat exchanger;
a second heat exchanger fluidly coupled to the pump and in thermal communication with the heat source, the second heat exchanger being configured to receive the second mass flow and transfer thermal energy from the heat source to the second mass flow, wherein the first and second heat exchangers are arranged in series in the heat source, but the first mass flow circulates in parallel with the second mass flow; and
a second expansion device fluidly coupled to the second heat exchanger and configured to expand the second mass flow.

10. The working fluid circuit of claim 9, further comprising:
a second recuperator fluidly coupled to the second expansion device and configured to transfer residual thermal energy from the combined mass flow to the second mass flow directed to the second heat exchanger; and
a third heat exchanger in thermal communication with the heat source and arranged between the pump and the first heat exchanger, the third heat exchanger being configured to receive and transfer thermal energy to the first mass flow prior to the first mass flow passing through the first heat exchanger, wherein the first, second, and third heat exchangers are arranged in series in the heat source.

11. The working fluid circuit of claim 10, further comprising a third recuperator arranged between the pump and the third heat exchanger, the third recuperator being configured to transfer residual heat from the combined mass flow discharged from the second recuperator to the first mass flow directed to the third heat exchanger.

12. A method for cooling a target fluid, comprising:
circulating a working fluid through a working fluid circuit with a pump;
heating the working fluid in a heat exchanger arranged in the working fluid circuit in fluid communication with the pump, wherein the heat exchanger is configured to be in thermal communication with a waste heat source;
cooling the working fluid with a condenser arranged in the working fluid circuit upstream from and fluidly coupled to the pump;
extracting a portion of the working fluid discharged from the heat exchanger to be used as a motive fluid in an ejector, the ejector being fluidly coupled to the heat exchanger;
extracting a portion of the working fluid discharged from the condenser to be used as a suction fluid in the ejector;
expanding the suction fluid in an expansion valve to generate a cooled suction fluid, the expansion valve being fluidly coupled to the condenser; and
cooling the target fluid with the cooled suction fluid in an evaporator fluidly coupled to the expansion valve.

13. The method of claim 12, further comprising:
entraining the suction fluid discharged from the evaporator into the ejector;
discharging a mixed fluid from the ejector; and
introducing the mixed fluid into or adjacent an inlet of the condenser.

14. The method of claim 12, further comprising extracting the target fluid from an upstream source, where the upstream source provides a coolant.

15. The method of claim 14, further comprising cooling the working fluid in the condenser with the coolant from the upstream source.

16. A refrigeration cycle, comprising:
an ejector fluidly coupled to a heat exchanger arranged in a working fluid circuit and configured to receive a motive fluid from the heat exchanger, wherein the heat exchanger is configured to transfer thermal energy from a waste heat source to a working fluid comprising carbon dioxide circulating throughout the working fluid circuit, wherein the motive fluid is a portion of the working fluid discharged from the heat exchanger;
a condenser arranged in the working fluid circuit and fluidly coupled to a discharge of the ejector, the condenser being configured cool the working fluid in the working fluid circuit and simultaneously cool a mixed fluid discharged from the ejector;
an expansion valve fluidly coupled to the condenser and configured to receive and expand a suction fluid to generate a cooled suction fluid, the suction fluid being a portion of the working fluid discharged from the condenser and subsequently entrained into the ejector to form part of the mixed fluid;
an evaporator in fluid communication with the expansion valve and having a target fluid circulating therein, the evaporator being configured to transfer thermal energy from the target fluid to the suction fluid such that the target fluid is cooled and the suction fluid evaporates; and
an upstream source fluidly coupled to the evaporator and providing the target fluid to the evaporator.

17. The refrigeration cycle of claim 16, wherein the expansion valve is a turbine.

18. The refrigeration cycle of claim 16, wherein the upstream source comprises water and is operable to cool the working fluid and the mixed fluid in the condenser.

19. The refrigeration cycle of claim 16, wherein the upstream source is in a liquid state or a gas state.

20. The refrigeration cycle of claim 16, wherein the target fluid is used in a separate system of duty after being cooled in the evaporator.

* * * * *